United States Patent
Ramakrishna et al.

(10) Patent No.: US 10,440,688 B2
(45) Date of Patent: Oct. 8, 2019

(54) FRAME STRUCTURES AND SIGNALING TECHNIQUES FOR A UNIFIED WIRELESS BACKHAUL AND ACCESS NETWORK

(71) Applicant: Samsung Electronics Co., Ltd, Suwon-si (KR)

(72) Inventors: Sudhir Ramakrishna, Plano, TX (US); Boon Loong Ng, Plano, TX (US); Li Guo, Allen, TX (US); Thomas David Novlan, Dallas, TX (US); Young-Han Nam, Plano, TX (US); Sridhar Rajagopal, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 15/335,346

(22) Filed: Oct. 26, 2016

(65) Prior Publication Data
US 2017/0208574 A1 Jul. 20, 2017

Related U.S. Application Data

(60) Provisional application No. 62/334,001, filed on May 10, 2016, provisional application No. 62/278,594, filed on Jan. 14, 2016.

(51) Int. Cl.
*H04W 72/04* (2009.01)
*H04L 5/00* (2006.01)
(Continued)

(52) U.S. Cl.
CPC ........ *H04W 72/0406* (2013.01); *H04B 7/155* (2013.01); *H04B 7/15528* (2013.01);
(Continued)

(58) Field of Classification Search
CPC .......... H04W 72/0406; H04W 72/042; H04W 84/047; H04W 40/22; H04B 7/15528
See application file for complete search history.

(56) References Cited

U.S. PATENT DOCUMENTS

| | | | |
|---|---|---|---|
| 9,893,850 B2* | 2/2018 | Ouyang | H04W 56/001 |
| 2010/0080139 A1* | 4/2010 | Palanki | H04B 7/2606 370/252 |

(Continued)

FOREIGN PATENT DOCUMENTS

KR 10-2014-0064858 A 5/2014

OTHER PUBLICATIONS

The International Searching Authority, "Written Opinion," International Application No. PCT/KR2017/000276; publisher ISA/KR International Application Division Korean Intellectual Property Division Korean Intellectual Property Office, Apr. 20, 2017—8 Pages.

(Continued)

*Primary Examiner* — Bo Hui A Zhu

(57) ABSTRACT

A relay node capable of supporting wireless backhaul communication includes a controller configured to identify a first timing of a backhaul downlink (DL) transmission and a second timing of an access uplink (UL) transmission to be substantially aligned, and a transceiver configured to receive at least one first symbol in the backhaul DL transmission from an base station (BS), and receive at least second symbol in an access UL transmission from a user equipment (UE). The controller is further configured to substantially align a third timing of a backhaul uplink (UL) transmission and a fourth timing of an access downlink (DL) transmission, wherein the transceiver is further configured to transmit at least third symbol in a backhaul uplink (UL) trans- (Continued)

mission to the BS, and transmit at least fourth symbol in the access DL transmission to the UE.

20 Claims, 30 Drawing Sheets

(51) Int. Cl.
| | |
|---|---|
| *H04W 40/22* | (2009.01) |
| *H04W 56/00* | (2009.01) |
| *H04B 7/155* | (2006.01) |
| *H04W 88/02* | (2009.01) |
| *H04W 88/08* | (2009.01) |
| *H04W 84/04* | (2009.01) |

(52) U.S. Cl.
CPC ........... *H04L 5/0055* (2013.01); *H04W 40/22* (2013.01); *H04W 56/00* (2013.01); *H04W 72/042* (2013.01); *H04W 84/047* (2013.01); *H04W 88/02* (2013.01); *H04W 88/08* (2013.01)

(56) References Cited

U.S. PATENT DOCUMENTS

| | | | |
|---|---|---|---|
| 2011/0299614 A1* | 12/2011 | Kim | H04B 7/155 375/260 |
| 2012/0063492 A1* | 3/2012 | Palanki | H04B 7/15585 375/211 |
| 2013/0010675 A1 | 1/2013 | Kim et al. | |
| 2013/0272188 A1 | 10/2013 | Seo et al. | |
| 2014/0269594 A1 | 9/2014 | Jang et al. | |
| 2015/0304014 A1 | 10/2015 | Sadeghi et al. | |
| 2016/0036504 A1* | 2/2016 | Khojastepour | H04J 11/005 370/280 |
| 2016/0099791 A1* | 4/2016 | Cui | H04J 11/0053 370/329 |
| 2017/0064731 A1* | 3/2017 | Wang | H04W 72/1263 |

OTHER PUBLICATIONS

The International Searching Authority, "International Search Report," International Application No. PCT/KR2017/000276; publisher ISA/KR International Application Division Korean Intellectual Property Division Korean Intellectual Property Office, Apr. 20, 2017—3 Pages.

Yifei Yuan, "LTE-Advanced Relay Technology and Standardization," Signals and Communication Technology 2013, Publisher; Springer Berlin Heidelberg, Jul. 20-12—200 Pages.

ETSI TS 136 211 V12.6.0 (Jul. 2015) LTE: Evolved Universal Terrestrial Radio Access (E-UTRA); Physical Channels and Modulation (3GPP TS 36.211 Version 12.6.0 Release 12)—138 Pages.

ETSI TS 136 212 V12.5.0 (Jul. 2015) LTE: Evolved Universal Terrestrial Radio Access (E-UTRA); Multiplexing and Channel Coding (3GPP TS 36.212 Version 12.5.0 Release 12)—96 Pages.

ETSI TS 136 213 V12.5.0 (Apr. 2015) LTE: Evolved Universal Terrestrial Radio Access (E-UTRA); Physical Layer Procedures (3GPP TS 36.213 Version 12.5.0 Release 12)—242 Pages.

ETSI TS 136 216 V12.0.0 (Oct. 2015) Universal Mobile Telecommunications System (UMTS); LTE: Evolved Universal Terrestrial Radio Access (E-UTRA); Physical Layer for Relaying Operation (3GPP TS 36.216 Version 12.0.0 Release 12)—18 Pages.

ETSI TS 136 300 V12.7.0 (Oct. 2015) LTE: Evolved Universal Terrestrial Radio Access (E-UTRA) and Evolved Universal Terrestrial Radio Access Network (E-UTRAN); Overall Description Stage 2 (3GPP TS 36.300 Version 12.7.0 Release 12)—264 Pages.

ETSI TS 136 331 V12.7.0 (Oct. 2015) LTE: Evolved Universal Terrestrial Radio Access (E-UTRA) Radio Resource Control (RRC); Protocol Specification (3GPP TS 36.331 Version 12.7.0 Release 12)—455 Pages.

Samsung, "Access uplink subframe timing alignment", 3GPP TSG RAN WG1 Meeting #59bis, Jan. 18-22, 2010, 5 pages, R1-100136.

Supplementary European Search Report dated Dec. 12, 2018 in connection with European Patent Application No. 17 73 8606, 8 pages.

* cited by examiner

FRAME STRUCTURES AND SIGNALING TECHNIQUES FOR A UNIFIED WIRELESS BACKHAUL AND ACCESS NETWORK

CROSS-REFERENCE TO RELATED APPLICATIONS AND CLAIM OF PRIORITY

This application claims priority under 35 U.S.C. § 119(e) to U.S. Provisional Patent Application No. 62/278,594 filed on Jan. 14, 2016, and U.S. Provisional Patent Application No. 62/334,001 filed on May 10, 2016. The above-identified provisional patent application is hereby incorporated by reference in its entirety.

TECHNICAL FIELD

The present disclosure relates generally to wireless communication systems. More specifically, this disclosure relates to frame structures and signaling techniques for a unified wireless backhaul and access network.

BACKGROUND

A communication system includes a DownLink (DL) that conveys signals from transmission points such as Base Stations (BSs) or eNodeBs to User Equipments (UEs) and an UpLink (UL) that conveys signals from UEs to reception points such as eNodeBs. A UE, also commonly referred to as a terminal or a mobile station, may be fixed or mobile and may be a cellular phone, a personal computer device, and the like. An eNodeB, which is generally a fixed station, may also be referred to as an access point or other equivalent terminology.

SUMMARY

In a first embodiment, a relay node capable of supporting wireless backhaul communication is provided. The relay node includes a controller configured to identify a first timing of a backhaul downlink (DL) transmission and a second timing of an access uplink (UL) transmission to be substantially aligned, and a transceiver configured to receive at least one first symbol in the backhaul DL transmission from an base station (BS), and receive at least second symbol in an access UL transmission from a user equipment (UE).

In some embodiments, the controller is further configured to substantially align a third timing of a backhaul uplink (UL) transmission and a fourth timing of an access downlink (DL) transmission, wherein the transceiver is further configured to transmit at least third symbol in a backhaul uplink (UL) transmission to the BS, and transmit at least fourth symbol in the access DL transmission to the UE.

In a second embodiment, base station (BS) capable of supporting wireless backhaul communication is provided. The BS includes a controller configured to substantially align a first timing of a backhaul downlink (DL) transmission and a second timing of an access downlink (DL) transmission, and a transceiver configured to transmit at least one first symbol in the backhaul DL transmission to a relay node, and transmit at least second symbol in the access DL transmission to a user equipment (UE).

In a third embodiment, a method for supporting wireless backhaul communication in a relay node is provided. The method includes identifying a first timing of a backhaul downlink (DL) transmission and a second timing of an access uplink (UL) transmission to be substantially aligned, receiving at least one first symbol in the backhaul DL transmission from a base station (BS), and receiving at least second symbol in the access UL transmission from a user equipment (UE).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 31C, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

Figure 1:
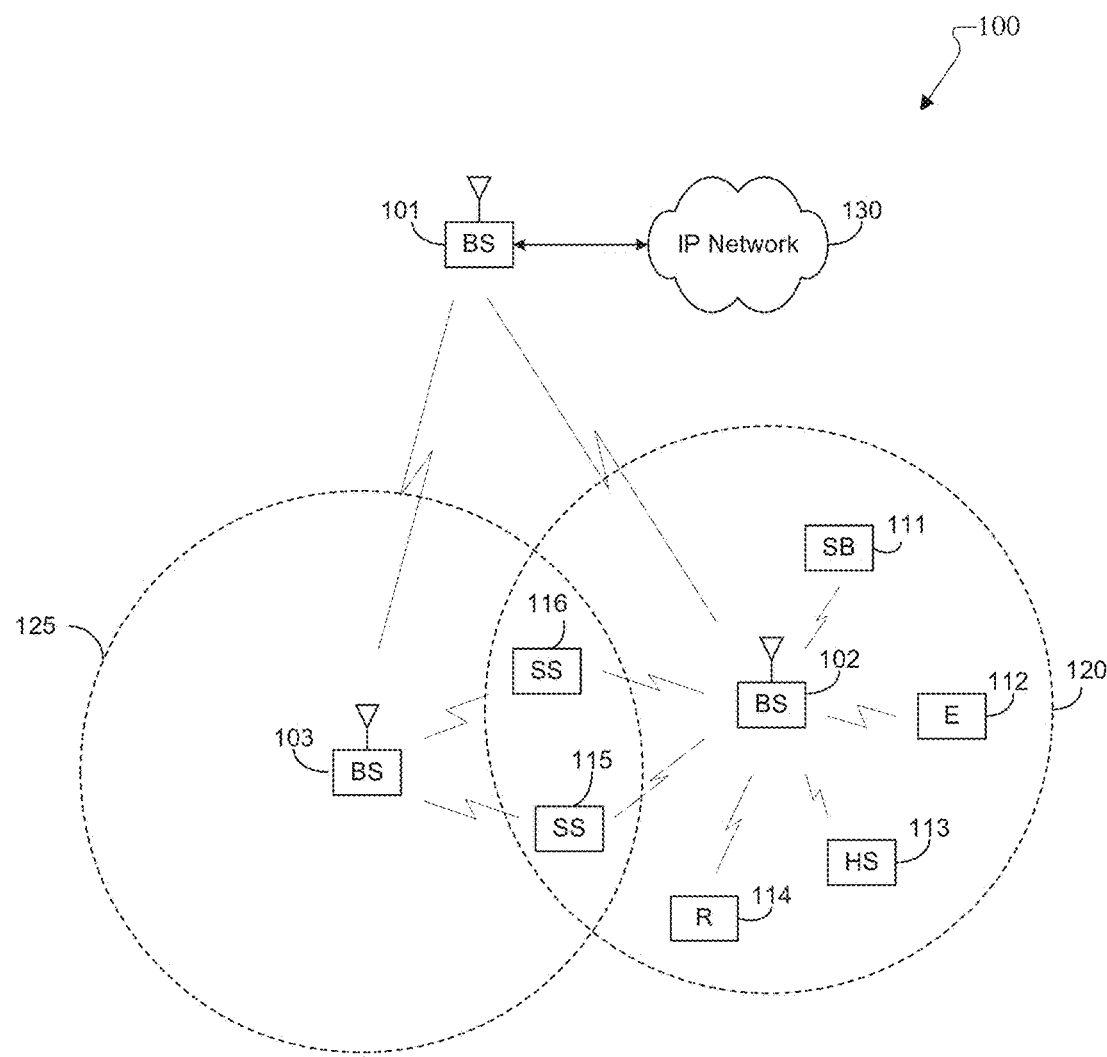
FIG. 1 illustrates an example wireless network according to this disclosure.

FIG. 1 illustrates an example embodiment of a wireless communication network 100 in accordance with present disclosure. As shown in FIG. 1, the wireless network 100 includes an eNodeB (eNB) 101, an eNB 102, and an eNB 103. The eNB 101 communicates with the eNB 102 and the eNB 103. The eNB 101 also communicates with an Internet Protocol (IP) network 130, such as the Internet, a proprietary IP network, or other data network. The eNB 102 and the eNB 103 are able to access the network 130 via the eNB 101 in this example.

The eNB 102 provides wireless broadband access to the network 130 (via the eNB 101) to user equipment (UE) within a coverage area 120 of the eNB 102. The UEs here include UE 111, which can be located in a small business (SB); UE 112, which can be located in an enterprise (E); UE 113, which can be located in a WiFi hotspot (HS); UE 114, which can be located in a first residence (R); UE 115, which can be located in a second residence (R); and UE 116, which can be a mobile device (M) (such as a cell phone, wireless laptop computer, or wireless personal digital assistant). Each of the UEs 111-116 can represent a mobile device or a stationary device. The eNB 103 provides wireless broadband access to the network 130 (via the eNB 101) to UEs within a coverage area 125 of the eNB 103. The UEs here include the UE 115 and the UE 116. In some embodiments, one or more of the eNBs 101-103 can communicate with each other and with the UEs 111-116 using LTE or LTE-A techniques. Additionally, one or more of the eNBs 101-103 can communicate using inter-eNB coordination methods as described herein.

Dotted lines show the approximate extents of the coverage areas 120 and 125, which are shown as approximately circular for illustration and explanation only. The coverage areas 120 and 125 can have other shapes, including irregular shapes, depending upon factors like the configurations of the eNBs and variations in radio environments associated with natural and man-made obstructions.

Depending on the network type, other well-known terms can be used instead of "eNodeB" or "eNB" for each of the components 101-103, such as "base station" or "access point." For the sake of convenience, the terms "eNodeB" and "eNB" are used here to refer to each of the network infrastructure components that provides wireless access to remote wireless equipment. Also, depending on the network type, other well-known terms can be used instead of "user equipment" or "UE" for each of the components 111-116, such as "mobile station" (MS), "subscriber station" (SS), "remote terminal" (RT), "wireless terminal" (WT), and "user device." For the sake of convenience, the terms "user equipment" and "UE" are used here to refer to remote wireless equipment that wirelessly accesses an eNB, whether the UE is a mobile device (such as a cell phone) or is normally considered a stationary device (such as a desktop computer or vending machine).

In some embodiments, the eNBs 101-103 can communicate with each other and with the UEs 111-116 using Orthogonal Frequency-Division Multiplexing (OFDM) or Orthogonal Frequency-Division Multiple Access (OFDMA) techniques. Also, each eNB 101-103 can have a globally unique identifier, such as a unique base station identifier (BSID). A BSID is often a media access control (MAC) identifier. Each eNB 101-103 can have multiple cells (such as when one sector represents one cell), and each cell can have a physical cell identifier or a preamble sequence, which is often carried in a synchronization channel.

Although FIG. 1 illustrates one example of a wireless network 100, various changes can be made to FIG. 1. For example, the network 100 could include any number of eNBs and any number of UEs in any suitable arrangement. Also, the eNB 101 could communicate directly with any number of UEs and provide those UEs with wireless broadband access to the network 130. Further, the eNB 101 could provide access to other or additional external networks, such as an external telephone network. In addition, the makeup and arrangement of the wireless network 100 is for illustration only.

Figure 2A:
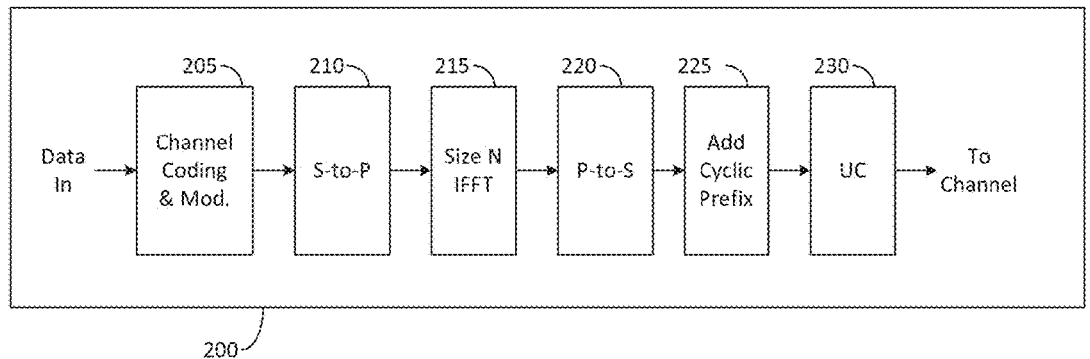
FIGS. 2A and 2B illustrate example wireless transmit and receive paths according to this disclosure.
Figure 2B:
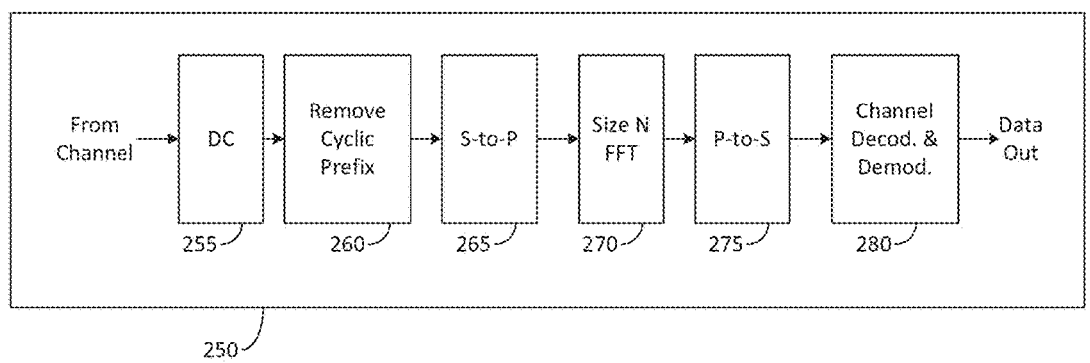

FIGS. 2A and 2B illustrate example embodiments of orthogonal frequency division multiple access (OFDMA) transmit and receive paths according to this disclosure. In FIG. 2A, a transmit path 200 can be implemented in an eNB, such as eNB 102 of FIG. 1. In FIG. 2B, a receive path 250 can be implemented in a UE, such as UE 116 of FIG. 1. It will be understood, however, that the receive path 250 could be implemented in an eNB (such as eNB 102 of FIG. 1) and that the transmit path 200 could be implemented in a UE. The transmit path 200 and the receive path 250 can be configured to implement inter-eNB coordination methods as described herein.

The transmit path 200 includes channel coding and modulation block 205, serial-to-parallel (S-to-P) block 210, size N Inverse Fast Fourier Transform (IFFT) block 215, parallel-to-serial (P-to-S) block 220, add cyclic prefix block 225, and up-converter (UC) 230. The receive path 250 includes down-converter (DC) 255, remove cyclic prefix block 260, serial-to-parallel (S-to-P) block 265, size N Fast Fourier Transform (FFT) block 270, parallel-to-serial (P-to-S) block 275, and channel decoding and demodulation block 280.

In some embodiments, at least some of the components in FIGS. 2A and 2B can be implemented in software, while other components can be implemented by configurable hardware or a mixture of software and configurable hardware. As particular examples, it is noted that the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

In the transmit path 200, the channel coding and modulation block 205 receives a set of information bits, applies coding (such as Turbo or LDPC coding), and modulates the input bits (such as with Quadrature Phase Shift Keying (QPSK) or Quadrature Amplitude Modulation (QAM)) to produce a sequence of frequency-domain modulation symbols. The serial-to-parallel block 210 converts (such as de-multiplexes) the serial modulated symbols to parallel data to produce N parallel symbol streams, where N is the IFFT/FFT size used in eNB 102 and UE 116. The size N IFFT block 215 performs an IFFT operation on the N parallel symbol streams to produce time-domain output signals. The parallel-to-serial block 220 converts (such as multiplexes) the parallel time-domain output symbols from the size N IFFT block 215 to produce a serial time-domain signal. The add cyclic prefix block 225 inserts a cyclic prefix to the time-domain signal. The up-converter 230 modulates (such as up-converts) the output of the add cyclic prefix block 225 to RF frequency for transmission via a wireless channel. The signal can also be filtered at baseband before conversion to RF frequency.

The transmitted RF signal arrives at the UE 116 after passing through the wireless channel, and reverse operations to those at the eNB 102 are performed. The down-converter 255 down-converts the received signal to baseband frequency, and the remove cyclic prefix block 260 removes the cyclic prefix to produce the serial time-domain baseband signal. The serial-to-parallel block 265 converts the time-domain baseband signal to parallel time domain signals. The size N FFT block 270 performs an FFT algorithm to produce N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 can implement a transmit path that is analogous to transmitting in the downlink to UEs 111-116 and can implement a receive path that is analogous to receiving in the uplink from UEs 111-116. Similarly, each of UEs 111-116 can implement a transmit path corresponding to the architecture for transmitting in the uplink to eNBs 101-103 and can implement a receive path corresponding to the architecture for receiving in the downlink from eNBs 101-103.

In some embodiments, an eNB can have one or multiple cells, and each cell can have one or multiple antenna arrays. Also, each array within a cell can have a different frame structure, such as different uplink and downlink ratios in a time division duplex (TDD) system. Multiple TX/RX (transmitting/receiving) chains can be applied in one array or in one cell. One or multiple antenna arrays in a cell can have the same downlink control channel (such as synchronization channel, physical broadcast channel, and the like) transmission, while other channels (such as data channels) can be transmitted in the frame structure specific to each antenna array.

Although FIGS. 2A and 2B illustrate examples of OFDMA transmit and receive paths, various changes can be made to FIGS. 2A and 2B. For example, various components in FIGS. 2A and 2B could be combined, further subdivided, or omitted and additional components could be added according to particular needs.

Figure 3A:
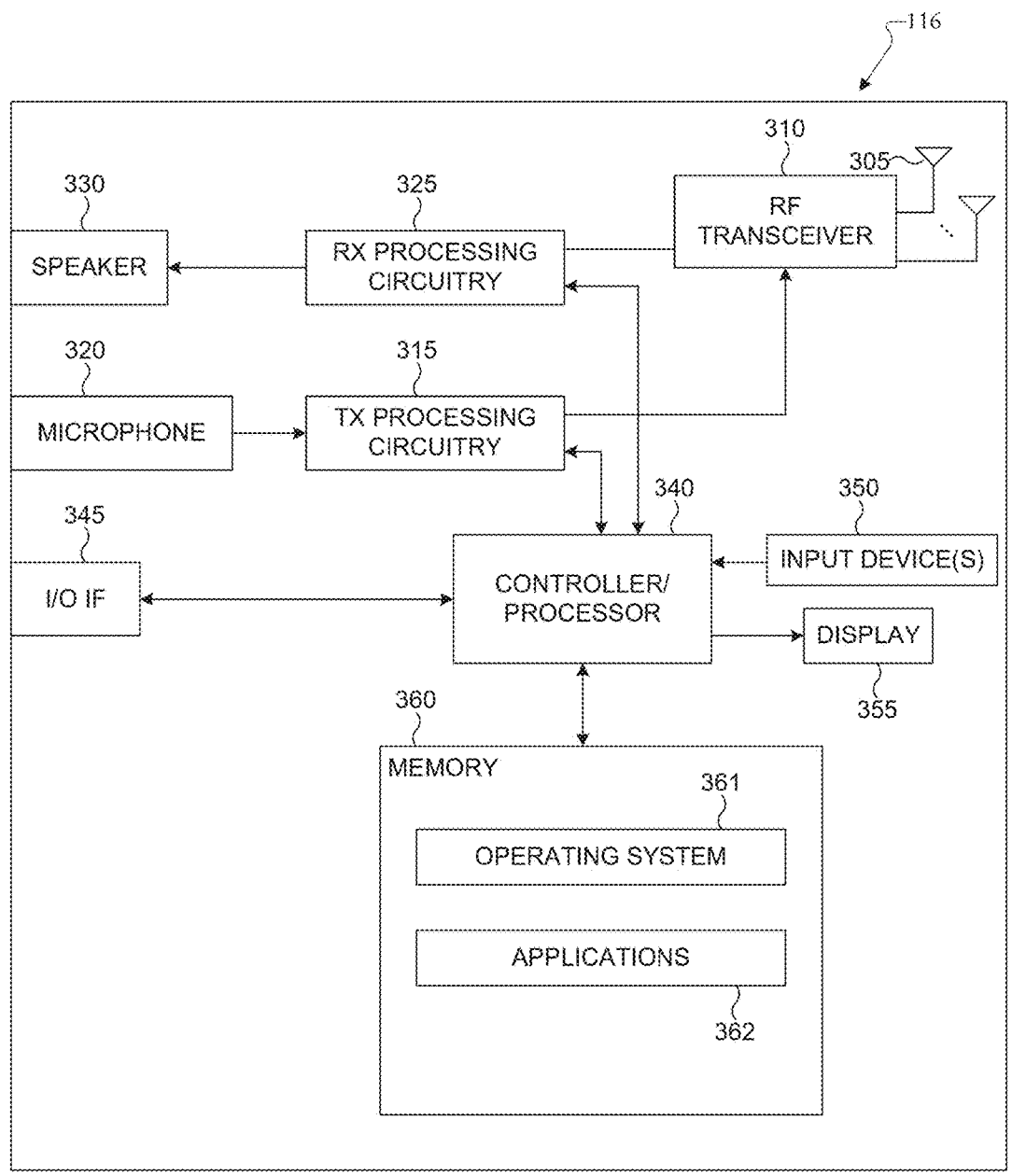
FIG. 3A illustrates an example user equipment according to this disclosure.

FIG. 3A illustrates an example embodiment of a UE 116 according to this disclosure. The UEs 111-115 of FIG. 1 could have the same or similar configuration. Note, however, that UEs come in a wide variety of configurations and that FIG. 3A does not limit this disclosure to any particular implementation of a UE.

As shown in FIG. 3A, the UE 116 includes an antenna 305, radio frequency (RF) transceiver 310, transmit (TX) processing circuitry 315, microphone 320, and receive (RX) processing circuitry 325. The UE 116 also includes a speaker 330, processor 340, input/output (I/O) interface (IF) 345, keypad 350, display 355, and memory 360. The memory 360 includes an operating system (OS) program 361 and a plurality of applications 362.

The RF transceiver 310 receives, from the antenna 305, an incoming RF signal transmitted by an eNB of the network 100. The RF transceiver 310 down-converts the incoming RF signal to produce an intermediate frequency (IF) or a baseband signal. The IF or baseband signal is sent to the RX processing circuitry 325, which produces a processed baseband signal by filtering, decoding, and/or digitizing the baseband or IF signal. The RX processing circuitry 325 transmits the processed baseband signal to the speaker 330 (such as voice data) or to the processor 340 for further processing (such as web browsing).

The TX processing circuitry 315 receives analog or digital voice data from the microphone 320 or other outgoing baseband data (such as web data, e-mail, interactive video game data) from the processor 340. The TX processing circuitry 315 encodes, multiplexes, and/or digitizes the outgoing baseband data to produce a processed baseband or IF signal. The RF transceiver 310 receives the outgoing processed baseband or IF signal from the TX processing circuitry 315 and up-converts the baseband or IF signal to an RF signal that is transmitted via the antenna 305.

In some embodiments, the processor 340 is a microprocessor or microcontroller. The memory 360 is coupled to the processor 340. Part of the memory 360 could include a random access memory (RAM), and another part of the memory 360 could include a Flash memory or other read-only memory (ROM).

The processor 340 can include one or more processors and execute the OS program 361 stored in the memory 360 in order to control the overall operation of the UE 116. In one such operation, the processor 340 controls the reception of forward channel signals and the transmission of reverse channel signals by the RF transceiver 310, the RX processing circuitry 325, and the TX processing circuitry 315 in accordance with well-known principles. The processor 340 can also include processing circuitry configured to allocate one or more resources. For example, the processor 340 can include allocator processing circuitry configured to allocate a unique carrier indicator and detector processing circuitry configured to detect a physical downlink control channel (PDCCH) scheduling a physical downlink shared channel (PDSCH) reception of a physical uplink shared channel (PUSCH) transmission in one of the carriers. Downlink Control Information (DCI) serves several purposes and is conveyed through DCI formats in respective PDCCHs. For example, a DCI format can correspond to a downlink assignment for PDSCH receptions or to an uplink grant for PUSCH transmissions.

The processor 340 is also capable of executing other processes and programs resident in the memory 360, such as operations for inter-eNB coordination methods to support inter-eNB carrier aggregation. It should be understood that inter-eNB carrier aggregation can also be referred to as dual connectivity. The processor 340 can move data into or out of the memory 360 as required by an executing process. In some embodiments, the processor 340 is configured to execute a plurality of applications 362, such as applications for MU-MIMO communications, including obtaining control channel elements of PDCCHs. The processor 340 can operate the plurality of applications 362 based on the OS program 361 or in response to a signal received from an eNB. The processor 340 is also coupled to the I/O interface 345, which provides UE 116 with the ability to connect to other devices such as laptop computers and handheld computers. The I/O interface 345 is the communication path between these accessories and the controller 340.

The processor 340 is also coupled to the keypad 350 and the display unit 355. The operator of the UE 116 can use the keypad 350 to enter data into the UE 116. The display 355 can be a liquid crystal display or other display capable of rendering text and/or at least limited graphics, such as from web sites.

Although FIG. 3A illustrates one example of UE 116, various changes can be made to FIG. 3A. For example, various components in FIG. 3A could be combined, further subdivided, or omitted and additional components could be added according to particular needs. Also, while FIG. 3A illustrates the UE 116 operating as a mobile telephone, UEs could be configured to operate as other types of mobile or stationary devices.

Figure 3B:
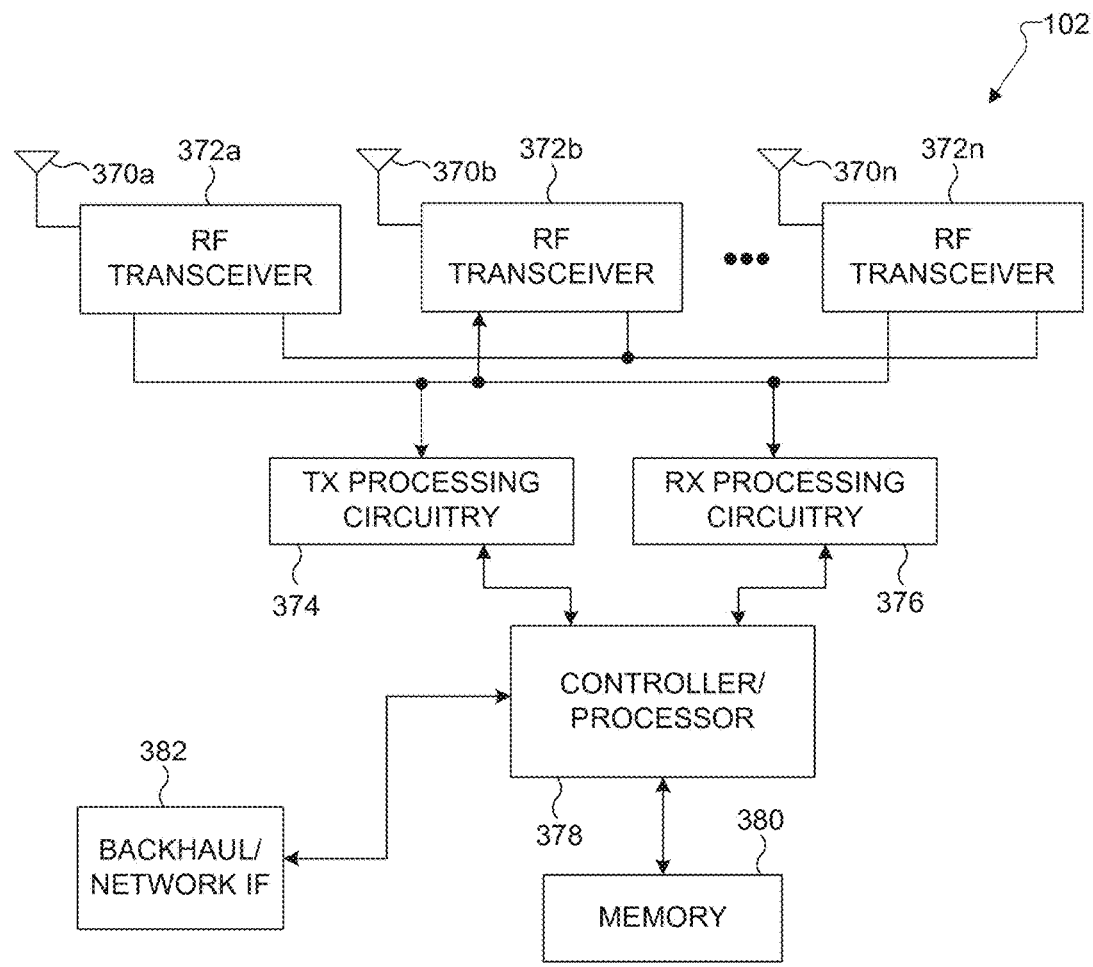
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 315 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 325. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes can be made to FIG. 3B. For example, the eNB 102 could include any number of each component shown in FIG. 3B. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

DL signals include data signals conveying information content, control signals conveying DL Control Information (DCI), and Reference Signals (RS), which are also known as pilot signals. An eNodeB transmits data information or DCI through respective Physical DL Shared CHannels (PDSCHs) or Physical DL Control CHannels (PDCCHs). Possible DCI formats used for downlink assignment include DCI format 1A, 1B, 1C, 1D, 2, 2A, 2B, 2C and 2D. A UE can be configured with a transmission mode which determines the downlink unicast reception method for the UE. For a given transmission mode, a UE can receive unicast downlink assignment using DCI format 1A and one of DCI format 1B, 1D, 2, 2A, 2B, 2C or 2D. An eNodeB transmits one or more of multiple types of RS including a UE-Common RS (CRS), a Channel State Information RS (CSI-RS), and a DeModulation RS (DMRS). A CRS is transmitted over a DL system BandWidth (BW) and can be used by UEs to demodulate data or control signals or to perform measurements. To reduce CRS overhead, an eNodeB can transmit a CSI-RS with a smaller density in the time and/or frequency domain than a CRS. For channel measurement, Non-Zero Power CSI-RS (NZP CSI-RS) resources can be used. For Interference Measurement Resources (IMRs), CSI Interference Measurement (CSI-IM) resources associated with a Zero Power CSI-RS (ZP CSI-RS) can be used. A UE can determine the CSI-RS transmission parameters through higher layer signaling from an eNodeB. DMRS is transmitted only in the BW of a respective PDSCH and a UE can use the DMRS to demodulate information in a PDSCH.

Figure 4:
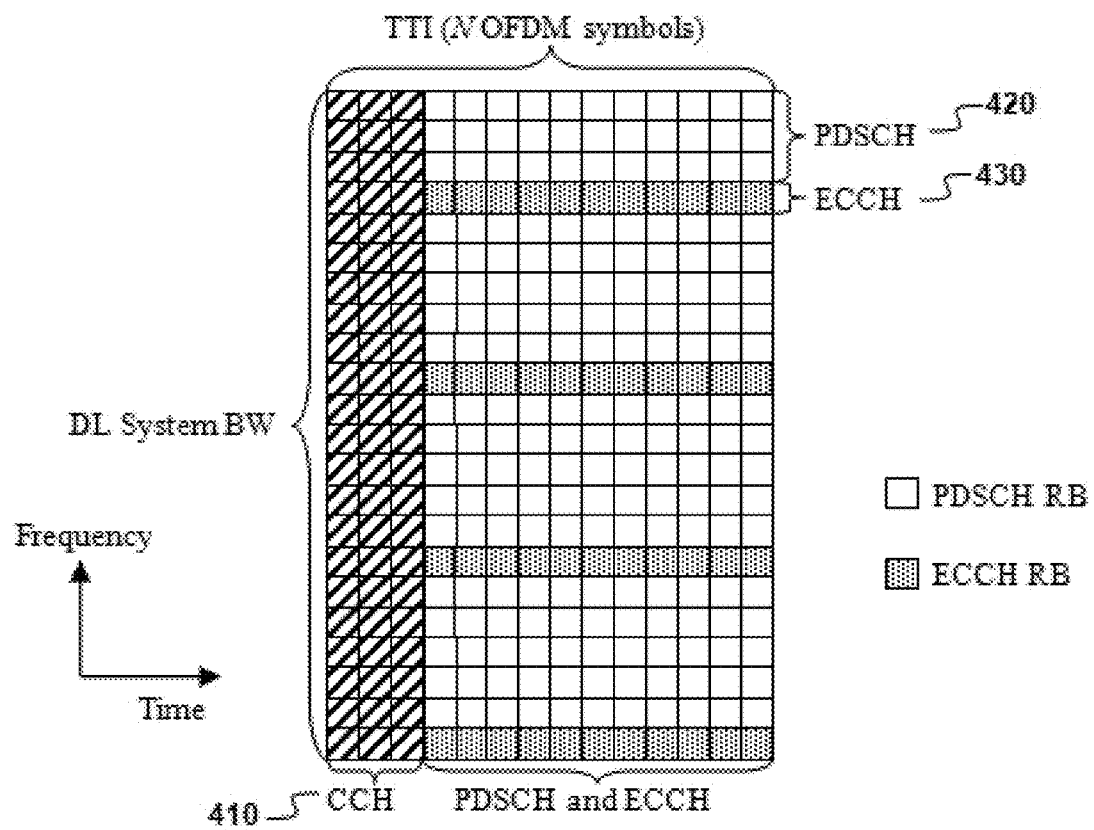
FIG. 4 is a diagram illustrating a structure of a DL Transmission Time Interval (TTI) in accordance with the present disclosure.

FIG. 4 is a diagram illustrating a structure of a DL Transmission Time Interval (TTI) in accordance with the present disclosure.

Referring to FIG. 4, DL signaling uses Orthogonal Frequency Division Multiplexing (OFDM) and a DL TTI has a duration of one millisecond (ms) and includes N=14 OFDM symbols in the time domain (or two slots) and K Resource Blocks (RBs) in the frequency domain. A first type of Control CHannels (CCHs) is transmitted in a first $N_1$ OFDM symbols 410 (including no transmission, $N_1$=0). A remaining $N-N_1$ OFDM symbols are used primarily for transmitting PDSCHs 420 and, in some RBs of a TTI, for transmitting a second type of CCHs (ECCHs) 430. Each RB consists of $N_{sc}^{RB}$ sub-carriers, or Resource Elements (REs), and a UE is allocated $M_{PDSCH}$ RBs for a total of $M_{sc}^{PDSCH} = M_{PDSCH} \cdot N_{sc}^{RB}$ REs for the PDSCH transmission BW. A unit of 1 RB in frequency and of 1 slot in time is referred to as Physical RB (PRB).

E-UTRAN supports relaying by having a Relay Node (RN) or Relay Base Station (BS) wirelessly connect to an eNB serving the RN, called Donor eNB (DeNB) or Donor BS.

Figure 5:
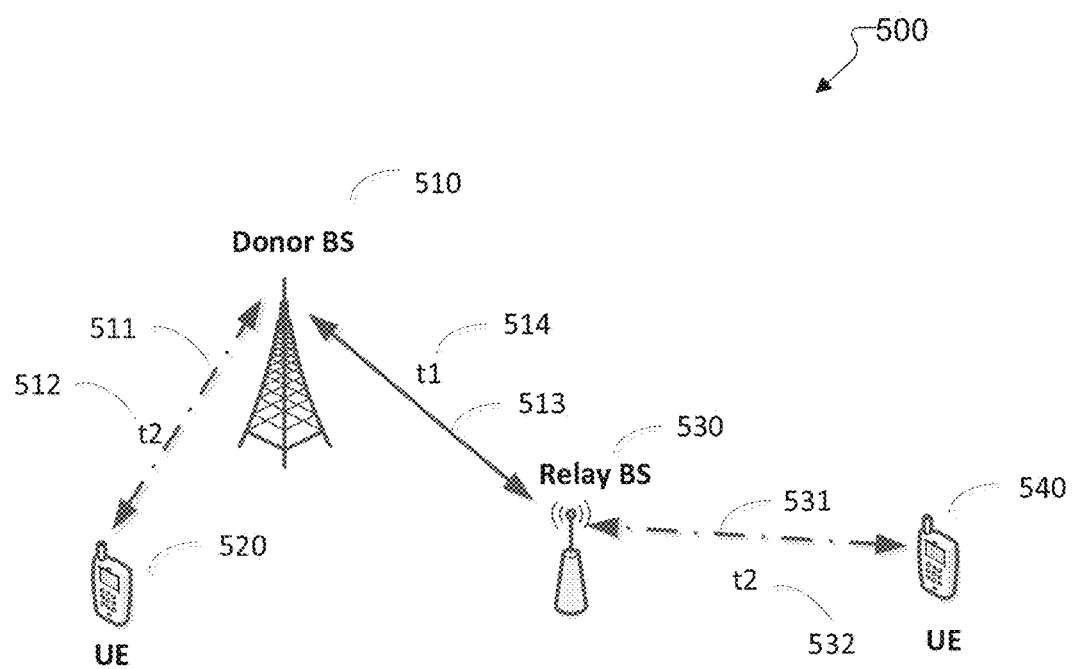
FIG. 5 is a diagram illustrating an example cellular network with a relay base station equipped with wireless backhaul in accordance with the present disclosure.

FIG. 5 is a diagram illustrating an example cellular network 500 with a relay base station equipped with wireless backhaul in accordance with the present disclosure.

Referring to FIG. 5, a RN 530 is wirelessly connect to an eNB serving the RN, called Donor eNB (DeNB) or Donor BS 510, via the Un interface 513, which is also be referred to as the backhaul for the RN. The RN supports the eNB functionality, i.e. it terminates the radio protocols of the E-UTRA radio interface, and the S1 and X2 interfaces. In addition to the eNB functionality, the RN also supports a subset of the UE functionality, e.g. physical layer, layer-2, RRC, and NAS functionality, in order to wirelessly connect to the DeNB. A UE can be served directly by the DeNB, such as UE 520, or it can be served by a RN, such as UE 540. For in-band relay operation, the wireless backhaul link 513 for the RN and the wireless access links (511, 531) for the DeNB and the RN share the same frequency band.

For in-band relaying operation, time-frequency resources are set aside for eNB-RN transmissions by time multiplexing eNB-RN and RN-UE transmissions. Subframes during which eNB-RN transmission can take place are configured by higher layers. Downlink subframes configured for eNB-to-RN transmission shall be configured as MBSFN subframes by the relay node to its UEs. eNB-to-RN transmissions occur in downlink subframes and RN-to-eNB transmissions occur in uplink subframes.

Figure 6:
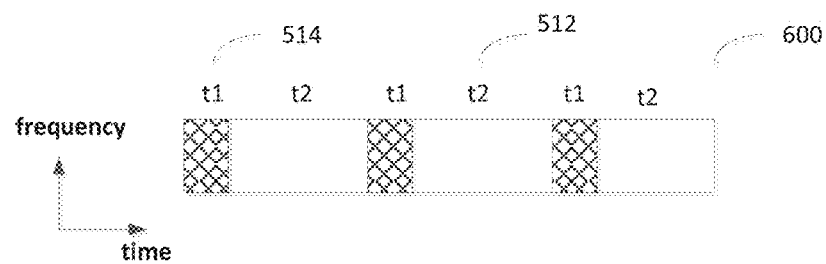
FIG. 6 is a diagram illustrating an example time multiplexing of eNB-RN and RN-UE transmissions in accordance with the present disclosure.

FIG. 6 is a diagram illustrating an example time multiplexing of eNB-RN and RN-UE transmissions 600 in accordance with the present disclosure.

Referring to FIG. 6, eNB-RN transmissions can occur in time slots t1 514 and RN-UE as well as eNB-UE transmissions occur in time slots t2 512. In this way, interference between eNB-RN links and RN/eNB-UE links can be avoided. In addition, further orthogonalization of resources is typically done among multiple RNs attached to the same eNB. In this example, time-frequency resources corresponding to time slots t1 are further divided among multiple eNB-RN links (e.g. in frequency or time domain), so as to avoid interference between the backhaul links. Resource reuse can be done for cells of different RNs if the inter-cell interference is sufficiently small. However, as a result of orthogonal resource allocation between the backhaul and the access links, such wireless relay systems do not scale easily with the number of RNs and UEs in the network, which limits its application in a dense cells deployment scenarios.

E-UTRAN also supports Dual Connectivity (DC) operation whereby a multiple Rx/Tx UE in RRC_CONNECTED is configured to utilize radio resources provided by two distinct schedulers, located in two eNBs connected via a non-ideal backhaul over the X2 interface. eNBs involved in DC for a certain UE can assume two different roles: an eNB can either act as an MeNB or as an SeNB. In DC a UE is connected to one MeNB and one SeNB. The configured set of serving cells for a UE consists of two subsets: the Master Cell Group (MCG) containing one or more serving cells of the MeNB, and the Secondary Cell Group (SCG) containing one or more serving cells of the SeNB.

Unified Wireless Backhaul and Access Network

In one embodiment, a base station (BS) can provide wireless access services to one or more UEs on one or more frequency bands. In addition, the BS can also provide wireless backhaul services to one or more relay BSs on all or a subset of the frequency bands used for the BS's wireless access services, without minimum or no performance impact to its serving UEs. Such BS is referred to as an anchor BS. A relay BS can also have wired backhaul connection to the anchor BS. The relay BS provides wireless access services to multiple UEs on one or more frequency bands used as backhaul between the anchor BS and the relay BS. In other words, the time-frequency resources of a frequency band are shared among the wireless access of the anchor BS, the wireless access of the relay BS and the wireless backhaul of the relay BS. The relay BS supports eNB functionality. From a UE's perspective, the relay BS is seen as an eNB. The invention in this disclosure can enable a new relay BS to be deployed and attached to an anchor BS, or an idle relay BS to be activated, without the need to install wired backhaul connection between the anchor BS and the relay BS, and with minimum or no negative performance impact to the other relay BSs that are either wirelessly attached or wired to the same anchor BS, and the UEs served by the anchor BS and the other relay BSs. Such wireless system is called a unified wireless backhaul and access network.

Figure 7:
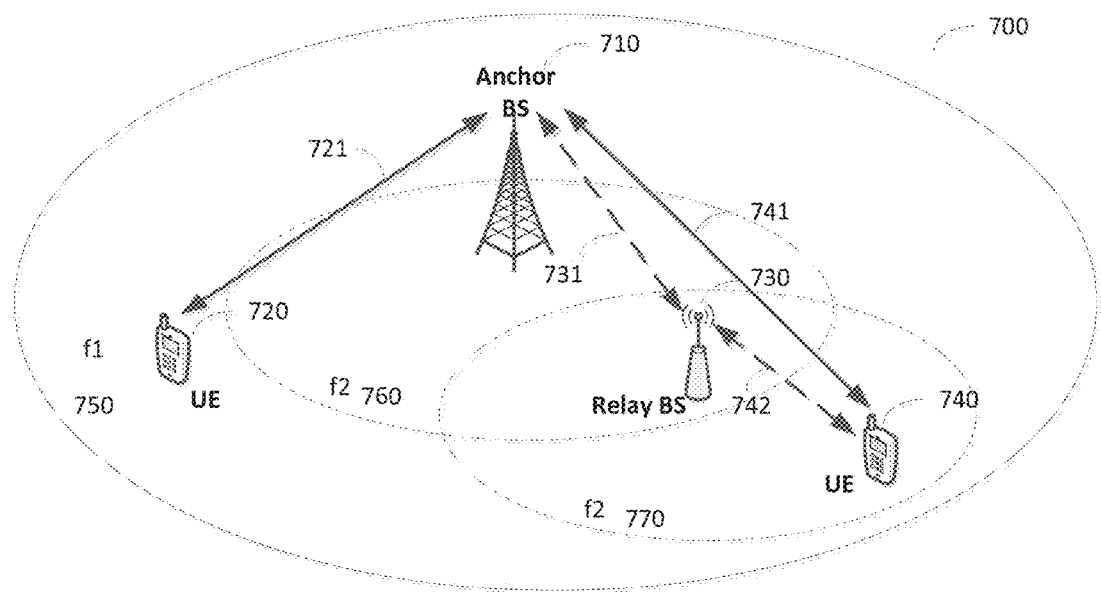
FIG. 7 illustrates an example of a unified wireless backhaul and access network in accordance with the present disclosure.

FIG. 7 illustrates an example of a unified wireless backhaul and access network 700 in accordance with the present disclosure.

Referring to FIG. 7, an anchor BS 710 is configured with two frequency bands (f1 and f2) where f1 has a larger coverage area 750 than that of f2 760, because f1 is of lower frequency (e.g. 600 MHz-2 GHz) than that of f2 (e.g. 3 GHz-300 GHz). A relay BS 730 is configured with one frequency band (f2) with coverage area 770. A UE 720 which is within the coverage at f1 of the anchor BS but is out of coverage of the anchor BS or relay BS at f2 is served by the anchor BS via the access link 721. A UE 740 which is within the coverage of the relay BS 730 at f2 can be associated with the relay BS 730 at f2 with access link 742. When the UE is also within the coverage of the anchor BS at f1, the UE can also be associated with the anchor BS at f1 with access link 741 simultaneously using a dual connectivity or a carrier aggregation configuration. In this case, the control plane signaling (RRC and mobility handling) and/or high QoS data can be delivered to the UE via f1, and best effort traffic can be delivered to the UE via f2. In case of dual connectivity, from the UE's perspective the anchor BS is the MeNB and the relay BS is the SeNB. In one alternative, both DL and UL are supported for relay BS-UE communications. In another alternative, only DL is supported for relay BS-UE communications and the UL is supported via UE-to-anchor BS communications.

It is noted that a standalone system based on frequency f2 is also possible. In this case, frequency f1 in FIG. 7 as well as the corresponding connection 721 between UEs to the anchor BS on f1 are not present.

In one embodiment, the relay BS can be simultaneously attached to, or associated with more than one anchor BSs. Such configuration can provide the following advantages. Multiple backhaul links to multiple anchor BSs increases the aggregate backhaul capacity which enables more UEs to be served by the relay BS. Multiple backhaul links to different anchor BS also avoid a single point of failure in the network, so that blockage to a backhaul link does not cause service outage to the whole cell provided by the relay BS. In one example, all or a subset of the backhaul links to different anchor BSs are active simultaneously. The set of active backhaul links can depend on factors such as the load of the relay BS cell, the load of the anchor BSs or the channel qualities/status (e.g. outage) of the backhaul links. In another example, only one of the backhaul links is active at a time. Similarly, the active backhaul link can be selected depending on factors such as the load of the relay BS cell, the load of the anchor BSs or the channel qualities/status (e.g. outage) of the backhaul links. In addition, when a relay BS is simultaneously attached to more than one anchor BSs, the relay BS can be used to serve UEs (within the coverage of the relay BS) that are connected to any one of the anchor BSs.

Figure 8:
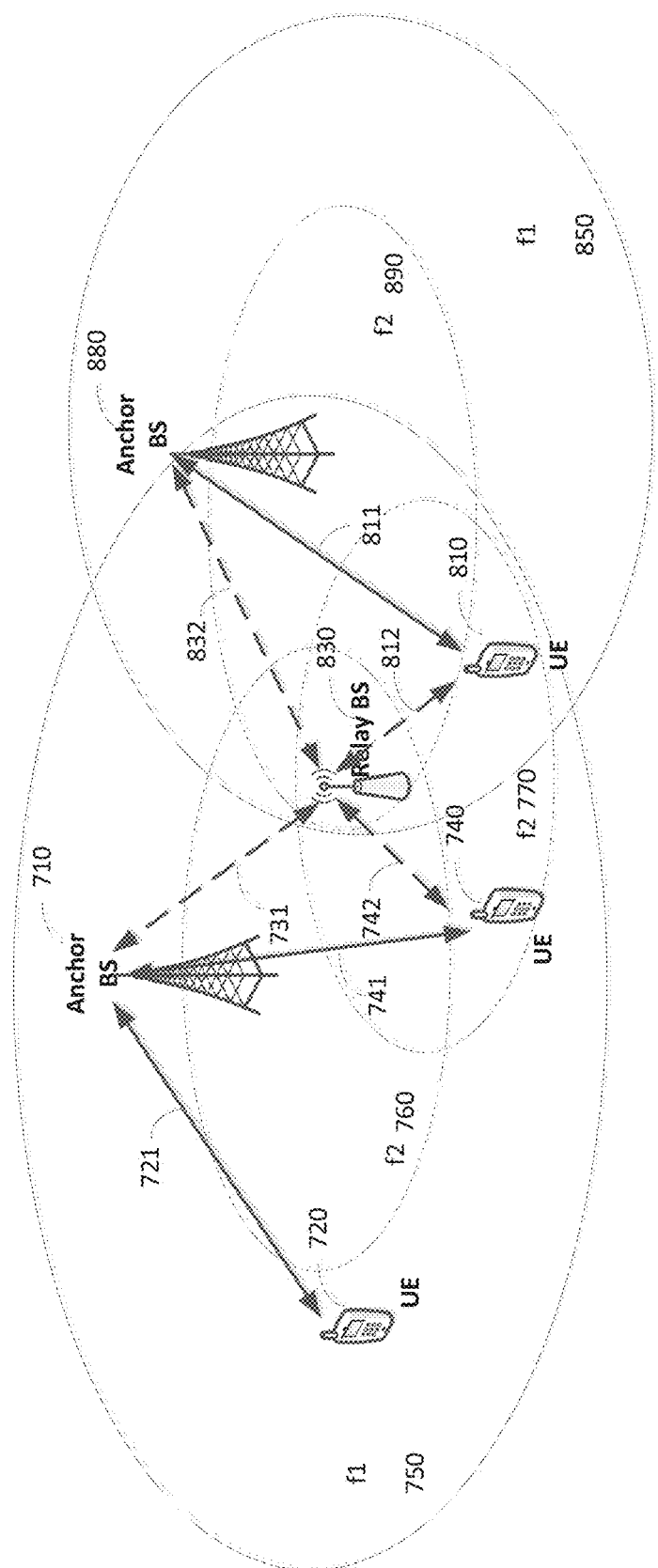
FIG. 8 illustrates an example of multiple backhaul links to multiple anchor BSs in accordance with the present disclosure.

FIG. 8 illustrates an example of multiple backhaul links to multiple anchor BSs in accordance with the present disclosure. Referring to FIG. 8, the relay BS 830 is associated with, or is attached to, both anchor BS 710 (with backhaul link 731) and anchor BS 880 (with backhaul link 832). The relay BS is also used to serve (812) a UE 810 (which is within the coverage of the relay BS) that are connected 811 to the anchor BS 880 on f1 with corresponding coverage 850.

In one embodiment, a UE can be associated with more than one relay BS simultaneously. This has an advantage that blockage to one relay BS does not cause service outage to the UE since the UE can continue to be served from another relay BS. In one example, all or a subset of the access links to different relay BSs are active simultaneously. The set of active access links can depend on factors such as the load of the relay BS cell, or the channel qualities/status (e.g. outage) of the access links. In another example, only one of the access links is active at a time. Similarly, the active access link can be selected depending on factors such as the load of the relay BS cell, or the channel qualities/status (e.g. outage) of the access links.

Figure 9:
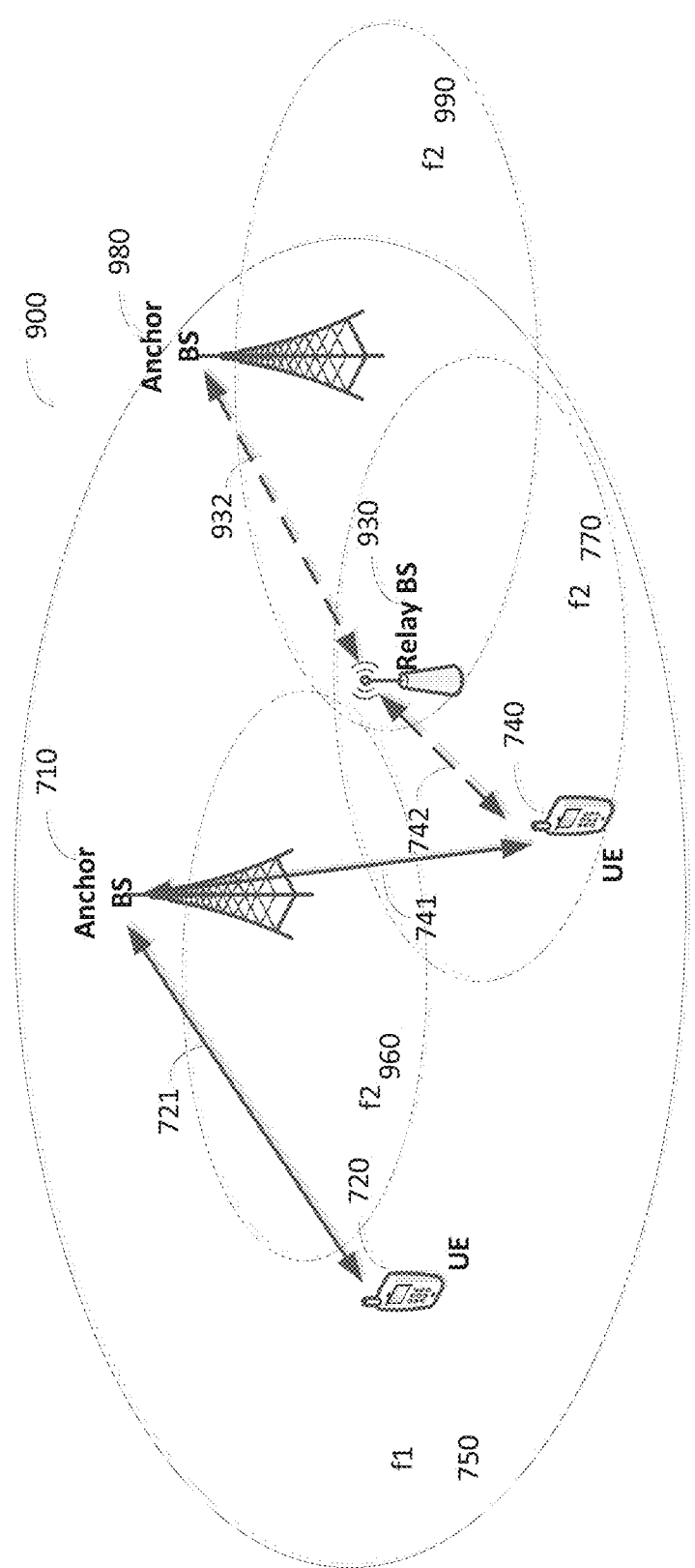
FIG. 9 illustrates an example of different anchor BS association by the relay BS and the UE in accordance with the present disclosure.

FIG. 9 illustrates an example of different anchor BS association by the relay BS and the UE in accordance with the present disclosure.

Referring to FIG. 9, the relay BS 930 is associated with, or is attached to, anchor BS 980 (with backhaul link 932), whereas its served UE 740 is associated with the anchor BS 710 at f1.

In one embodiment, a relay BS can be associated with, or is attached to, another relay BS, which in turned can be associated with an anchor BS or with another relay BS.

In one embodiment, there can be a dedicated RF front end and antenna panel for backhaul links, and another dedicated RF front end and antenna panel for access links at a relay BS. Similar arrangement can be made at the anchor BS. In addition, there can be another dedicated RF front end and antenna panel for the access links at the lower frequency f1. In another embodiment, there can be a common RF front and antenna panel shared between the backhaul and access links at a relay BS. Similar arrangement can be made at the anchor BS. In addition, there can be another dedicated RF front end and antenna panel for the access links at the lower frequency f1.

In one embodiment, the backhaul and the access sharing the same frequency band are based on the same radio access technology and modulation waveform (such as OFDM), but different OFDM symbol numerologies of the radio access technology for the backhaul and the access, such as the subcarrier spacing and/or the OFDM symbol duration can be configured and/or the cyclic prefix overhead. This can be a result of different wireless channel properties for the backhaul and the access links, different hardware and signal processing capabilities of the transmitters and receivers for the backhaul and the access links, different traffic patterns or loads for the backhaul and the access links, different data rates, latency requirements and QoS requirements for the backhaul and the access links, and others. An example of the differences between the backhaul and the access links is given in Table 1.

TABLE 1

| Properties | Backhaul link | Access link |
|---|---|---|
| Environment | Case 1: Urban Macro<br>Case 2: Urban Micro | Case 1: Urban Micro<br>Case 2: Hotspot |
| Outdoor/indoor | Outdoor | Outdoor or indoor |
| Line-of-sight (LOS)/Non-LOS (NLOS) | LOS with high probability | LOS/NLOS probability according to environment |
| Coverage (pathloss) | Large | Small |
| Channel time delay spread | Depends on cell size, LOS condition & beamforming | Depends on cell size, LOS condition & beamforming |
| Transmit power | Can be larger than access's | Can be smaller than backhaul's |
| Transmit beamforming gain | Large | Large |
| Receiver form factor (receive beamforming gain) | Large | Small |
| Receiver mobility | Static (low Doppler spread) | Mobile (high Doppler spread) |
| Traffic over link | Less dynamic (due to traffic aggregation) | Dynamic |

In one embodiment, a UE can be associated with a first anchor BS at f1 and a relay BS at f2, but the anchor BS that the relay BS is associated with, or is attached to, is a second anchor BS (i.e. not the same as the first anchor BS). This configuration is beneficial when the relay BS is actually not within the coverage of the first anchor BS at f2 or if the backhaul link to the first anchor BS is not suitable due to poor SINR condition.

In one example, to meet the low latency requirements of the backhaul link, the OFDM symbol duration is shortened for the backhaul link compared to that for the access link, but the sub-carrier spacing is increased for the backhaul link compared to that for the access link. In another example, for a certain deployment scenario, when the channel time delay spread is larger for the backhaul links due to the larger coverage area, the OFDM symbol duration is larger for the backhaul links compared to that for the access links (in order to maintain the same or similar cyclic prefix overhead), and the subcarrier spacing is shortened to reduce the loss in data rate. In another example, for a certain deployment scenario, when the channel time delay spread is shorter for the backhaul links due to the predominantly LOS channel condition, the cyclic prefix overhead of the backhaul link can be smaller compared to that for the access link. In another example, when different numerologies are configured for the backhaul and the access links, the subcarrier spacing or the OFDM symbol duration of one numerology are an integer multiple of the other. Such configuration can be advantageous for certain spectrum sharing schemes (such as time-division multiplexing and space-division multiplexing) between the backhaul and the access to maximize resource utilization (as alignment of symbol or subframe or frame boundary can be easier).

In one embodiment, the backhaul and the access sharing the same frequency band are based on the same radio access technology and modulation waveform (such as OFDM), but different slot/subframe/frame structure numerologies (such as the slot/subframe/frame duration or composition) are configured for the backhaul and the access links. For example, a subframe for the backhaul link consists of X number of OFDM symbols while a subframe for the access link consists of Y number of OFDM symbols, where X and Y can be different. It is more efficient to multiplex data of different traffic types in a single transmission over backhaul links, while a single transmission over the access link can contain only one or a small subset of data types which needs to be delivered to a UE according to the corresponding QoS requirements. As a result, there can be a single latency requirement for the backhaul links regardless of the traffic type while the latency requirements for the access links vary according to the type of data to be delivered. Shorter subframe duration can be configured for tighter latency requirement.

In one embodiment, the backhaul and the access sharing the same frequency band are based on the same radio access technology and modulation waveform (such as OFDM), but different system configurations of the radio access technology for the backhaul and the access, such as the system bandwidth, the transmit power, the transmission modes, the DL/UL resource allocation schemes, the modulation schemes, can be configured. In one example, larger system bandwidth or higher modulation order can be configured for the backhaul links than that configured for the access links to enable higher data rate for the backhaul links. In another example, due to traffic aggregation over the backhaul link (which implies the backhaul traffic is less dynamic or bursty), it is advantageous to configure DL/UL resource allocation/assignment schemes with reduced dynamic control signaling overhead for the backhaul links. Examples of DL/UL resource allocation/assignment schemes include multi-subframe scheduling whereby a single dynamic control channel schedules data transmission in multiple consecutive subframes, and semi-persistent scheduling whereby the resources for data transmission are assigned in a semi-persistent manner, such as reserving a block of subframes for data transmission in a periodic manner. For the access link, either dynamic scheduling or scheduling with reduced control overhead can be used for a UE according to the traffic type. In another example, due to the static nature of the relay BS, a closed loop transmission mode can be configured for the backhaul link. For the access link, both open loop and closed loop transmission modes can be configured for a UE according to the channel condition and UE mobility.

In one embodiment, the waveforms for the backhaul and the access sharing the same frequency band are different. In one example, schemes that do not require CP overhead such as FBMC (Filter Bank Multi-Carrier) is used for the backhaul link, while OFDM is used for the access link, where the multi-path channel condition requires robust Inter-Symbol-Interference (ISI) protection with larger cyclic prefix duration. A further advantage of using such schemes for backhaul is that the receiver can be more complex than a UE, and more sophisticated or signal processing intensive interference cancellation techniques can be applied to mitigate ISI due to the lack of CP addition at the transmitter.

Backhaul and Access Spectrum Sharing Schemes

Figure 10:
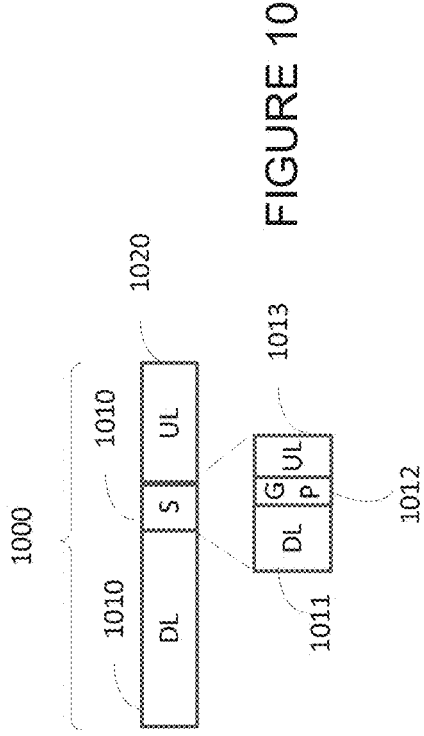
FIG. 10 illustrates a frame structure for both the backhaul and the access links in accordance with the present disclosure.

In the following embodiments, a TDD frame structure as illustrated in FIG. 10 is assumed. Referring to FIG. 10, a frame 1000 comprises one or more consecutive DL subframes 1010, followed by a special subframe 1010 and one or more consecutive UL subframes 1020. A special subframe 1010 consists of a DL portion 1011, a guard period 1012 and a UL portion 1013. The assumed frame structure is by way of illustration only and should not be construed to limit the scope of this disclosure.

In this disclosure, the same frame structure as illustrated in FIG. 10 is assumed for both the backhaul and the access links. It is not precluded that different frame structures are possible for the backhaul and the access links.

The backhaul link and the access link share the same frequency band. A relay BS is not able to receive on the backhaul link (from an anchor BS) and transmit on the access link (to a UE) at the same time when the transmission on the access link interferes with the backhaul link reception. Similarly, a relay BS is not able to transmit on the backhaul link (to an anchor BS) and receive on the access link (from a UE) at the same time when the transmission on the backhaul link interferes with the access link reception. This is referred to as the "half-duplex" problem of the relay BS. The inter-link interference can be a result of insufficient isolation between the antennas for the backhaul link and the antennas for the access link. Therefore, there is a need to design spectrum sharing schemes between the backhaul link and the access link.

In a first method, the backhaul frames and the access frames are multiplexed in time domain to avoid inter-link interference.

Figure 11:
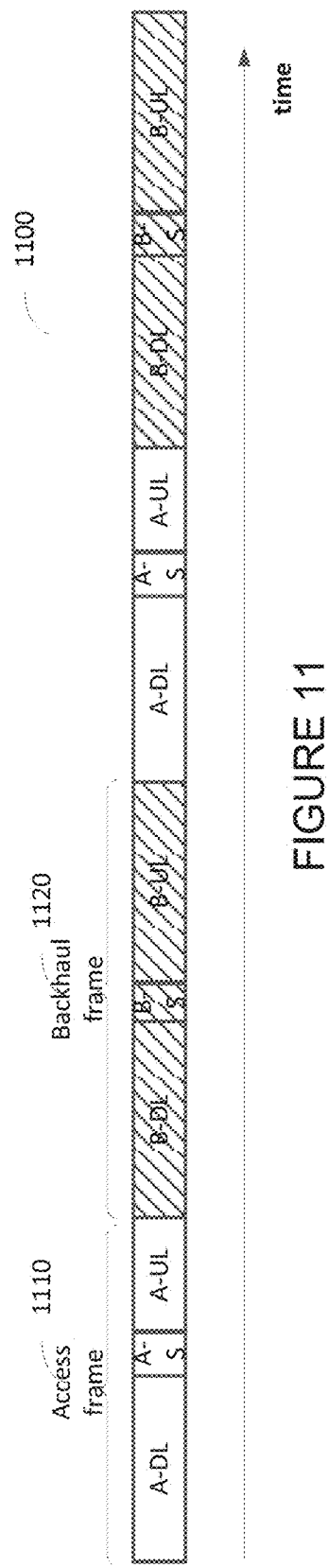
FIG. 11 illustrates an example of time division multiplexing between the access frames and the backhaul frames in accordance with the present disclosure.

FIG. 11 illustrates an example of time division multiplexing between the access frames 1110 and the backhaul frames 1120 in accordance with the present disclosure.

Figure 12:
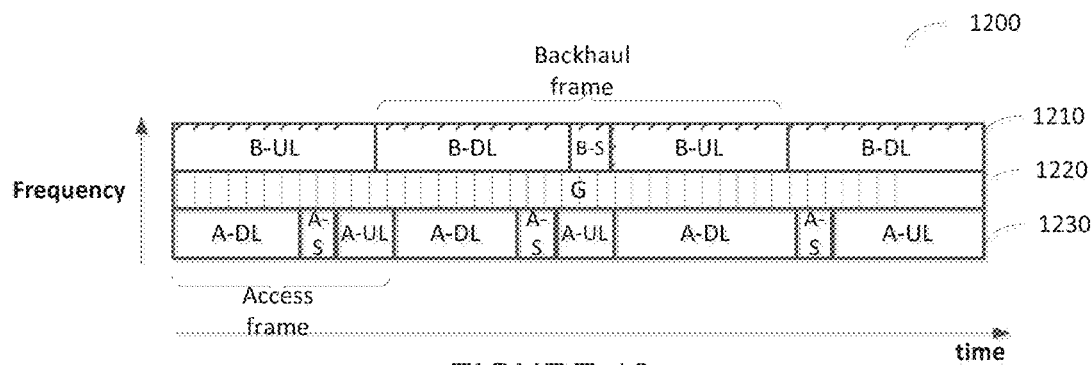
FIG. 12 illustrates an example frequency division multiplexing of backhaul frames and access frames in accordance with the present disclosure.

In a second method, FIG. 12 illustrates an example frequency division multiplexing of backhaul frames and access frames in accordance with the present disclosure.

The backhaul frames and the access frames are multiplexed in frequency domain as illustrated in FIG. 12. The backhaul frames are allocated a first frequency subband 1210 while the access frames are allocated in a second frequency subband 1230. A guard band 1220 is required to avoid inter-link interference. However, the guard band can be reduced by applying frequency domain filtering on each frequency subband. Compared to the first method, the second method has the advantage of allowing flexible scheduling or resource allocation in time for both the backhaul and the access links.

In a third method, the backhaul frames and the access frames are multiplexed in the spatial domain. To overcome the "half-duplex" problem, the DL and UL of the backhaul link is spatially multiplexed with the UL and the DL of the access link on the same time-frequency resource, respectively. For the relay BS, the DL-to-UL switchpoint for the backhaul link and the UL-to-DL switchpoint for the access link are aligned; similarly, the UL-to-DL switchpoint for the backhaul link and the DL-to-UL switchpoint for the access link are aligned. The anchor BS, the relay BS and the UEs are assumed capable of high order transmit and/or receive beamforming, which is feasible when they are equipped with a large number of antennas. In addition, reasonably small antenna panel form factor is feasible at high frequency (such as 20 GHz-300 GHz).

Figure 13:
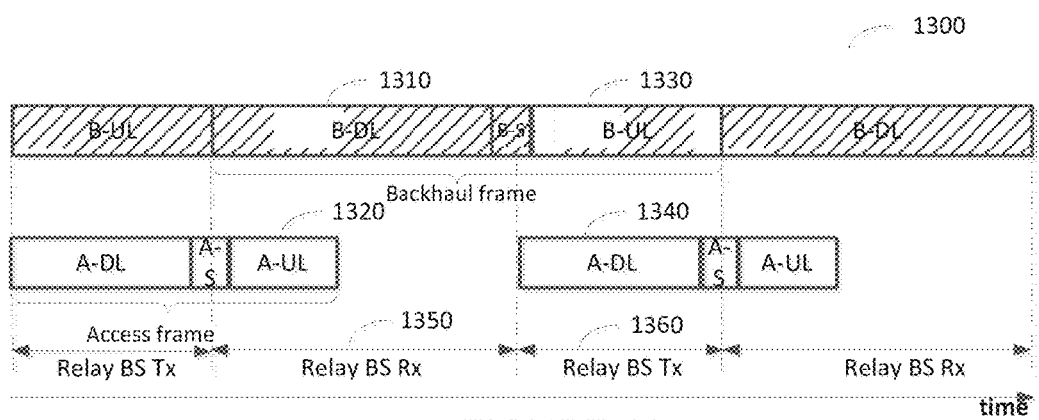
FIG. 13 illustrates an example of spatial multiplexing between the backhaul link and the access link in accordance with the present disclosure.

FIG. 13 illustrates an example of spatial multiplexing between the backhaul link and the access link in accordance with the present disclosure. Compared to the first and the second method, maximum sharing of spectrum resource can be achieved between the backhaul and the access links.

Referring to FIG. 13, the DL of the backhaul link 1310 is spatially multiplexed with the UL of the access link 1320 on the same time-frequency resource, so that the relay BS is only performing receptions on both the backhaul link and the access link at a given time 1350. Similarly, the UL of the backhaul link 1330 is spatially multiplexed with the DL of the access link 1340 on the same time-frequency resource, so that the relay BS is only performing transmission on both the backhaul link and the access link at a given time 1360.

In one embodiment, a combination of the above methods can be employed. For example, to enable a larger data rate for the backhaul link, a frequency subband can be allocated exclusively for the backhaul link, and the rest of the bandwidth can be shared between the backhaul and the access link via time-division multiplexing according to the first method or via space-division multiplexing according to the third method.

To enable spectrum sharing between the backhaul and the access link, there is a need for a coordination protocol or procedure between the anchor BS and the relay BS.

Figure 14:
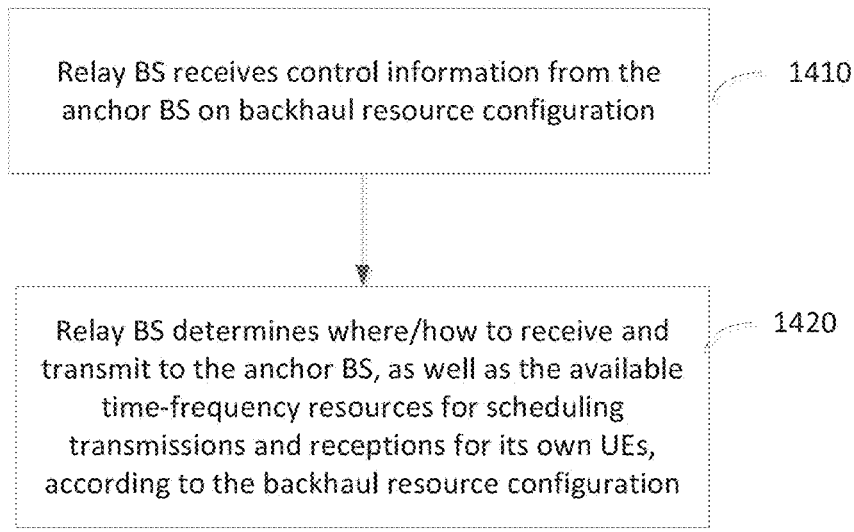
FIG. 14 illustrates an example resource coordination procedure between the anchor BS and the relay BS in accordance with the present disclosure.

FIG. 14 illustrates an example resource coordination procedure between the anchor BS and the relay BS in accordance with the present disclosure.

In 1410, the anchor BS determines the backhaul resource or frame structure configuration and signal to the relay BSs (such as through a common control or broadcast channel). Another example of the control signaling can be the time locations of backhaul DL-to-UL and UL-to-DL switch points. In 1420, upon receiving the backhaul resource configuration, each relay BS can determine where/how to receive and transmit to the anchor BS as well as the available time-frequency resources for scheduling transmissions and receptions for its own UEs.

Figure 15:
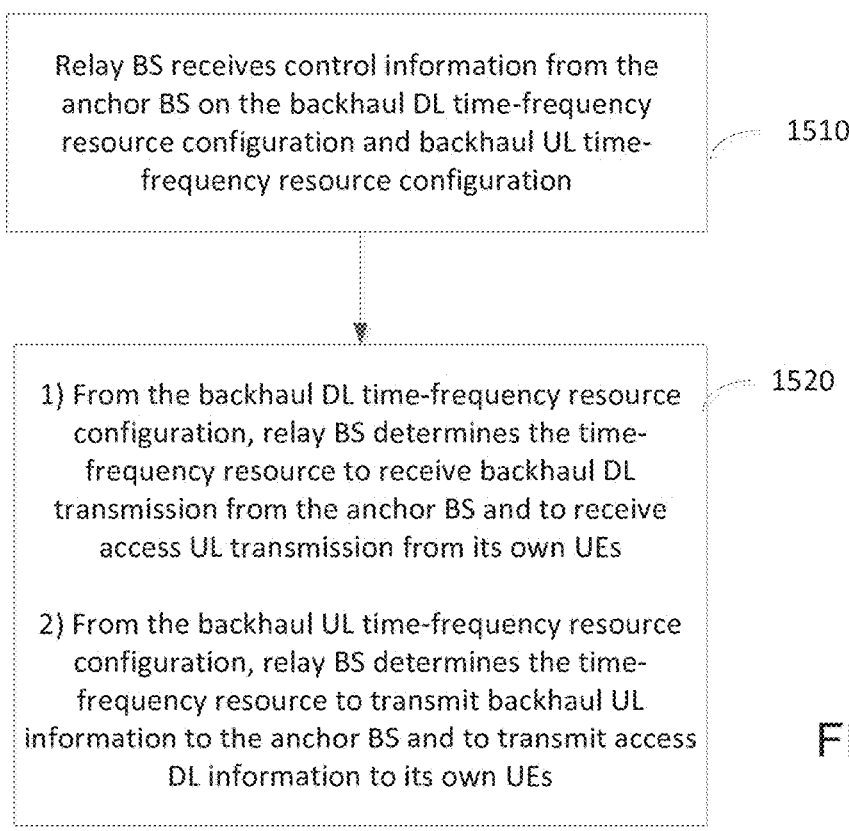
FIG. 15 illustrates an example of resource coordination procedure between the anchor BS and the relay BS in accordance with the third method of spectrum sharing scheme in accordance with the present disclosure.

FIG. 15 illustrates an example of resource coordination procedure between the anchor BS and the relay BS in accordance with the third method of spectrum sharing scheme in accordance with the present disclosure. Referring to FIG. 15, in 1510 the anchor BS determines the backhaul DL time-frequency resource and the backhaul UL time-frequency resource, and signal to the relay BSs (such as through a common control or broadcast channel). In 1520, upon receiving the backhaul DL time-frequency resource configuration, each relay BS can determine the time-frequency resource to receive backhaul DL transmission from the anchor BS, and to schedule and receive access UL transmissions from its own UEs. Upon receiving the backhaul UL time-frequency resource configuration, each relay BS can determine the time-frequency resource to transmit backhaul UL information to the anchor BS, and to schedule and transmit access DL information to its own UEs.

When there are time-frequency resource that is not indicated to be assigned for backhaul, the relay BS can perform scheduling for access in a flexible manner (without constraint from the backhaul resource configuration). In one alternative, the relay BS is not allowed to schedule/perform access transmissions/receptions on those resources. In another alternative, whether the relay BS is free to schedule/perform access transmissions/receptions on those resources is indicated by the anchor BS.

In another example, instead of signaling the backhaul resource configuration, the anchor BS signals the available access resource configuration to the relay BS. The relay BS then derives the backhaul resource configuration from the available access resource configuration according to the spectrum sharing scheme.

In one embodiment, the relay BS can indicate desired or required access resource to serve its UEs to the anchor BS, so that the anchor BS can take the information into account in deciding backhaul resource configuration in accordance with the employed spectrum sharing scheme.

Figure 16:
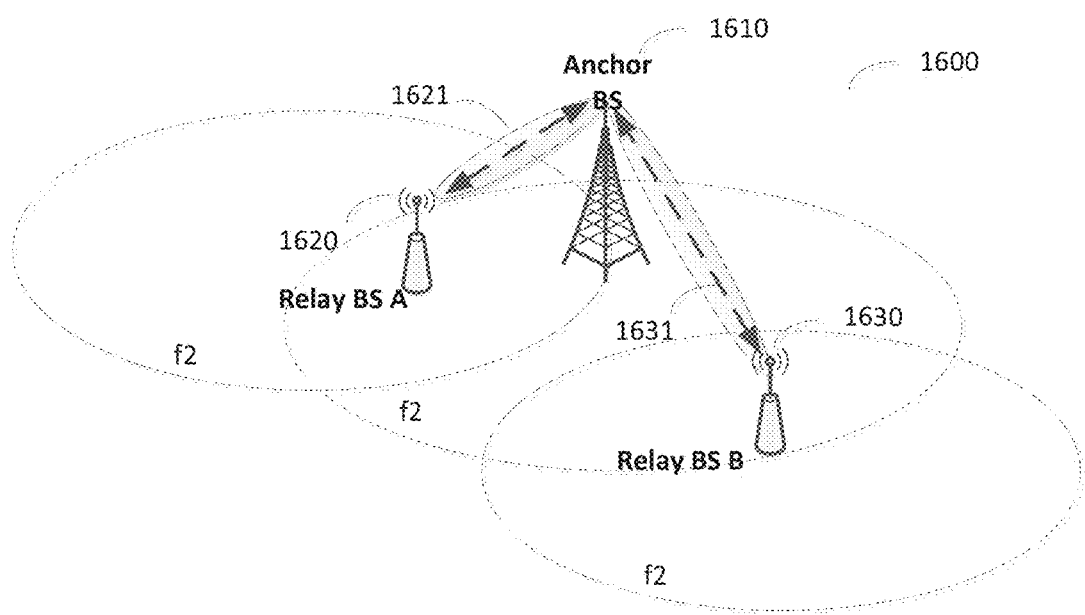
FIG. 16 illustrates an example space division multiplexing of backhaul frames and access frames in accordance with the present disclosure.

FIG. 16 illustrates an example space division multiplexing of backhaul frames and access frames in accordance with the present disclosure.

In one embodiment, to enable efficient support for multiple relay BSs by an anchor BS, transmission from the anchor BS to multiple relay BSs can be performed simultaneously via spatial multiplexing. Spatial multiplexing interference can be mitigated through a multi-user precoding algorithm that optimize a certain performance metric such as Signal-to-Leakage-and-Noise-Ratio (SLNR) maximization or zero-forcing of multi-user interference. Spatial multiplexing of multiple relay BSs by an anchor BS is illustrated in FIG. 16, where the anchor BS 1610 performs precoding and transmits simultaneously 1621 and 1631 to the relay BSs 1620 and 1630.

Figures 17A, 17B:
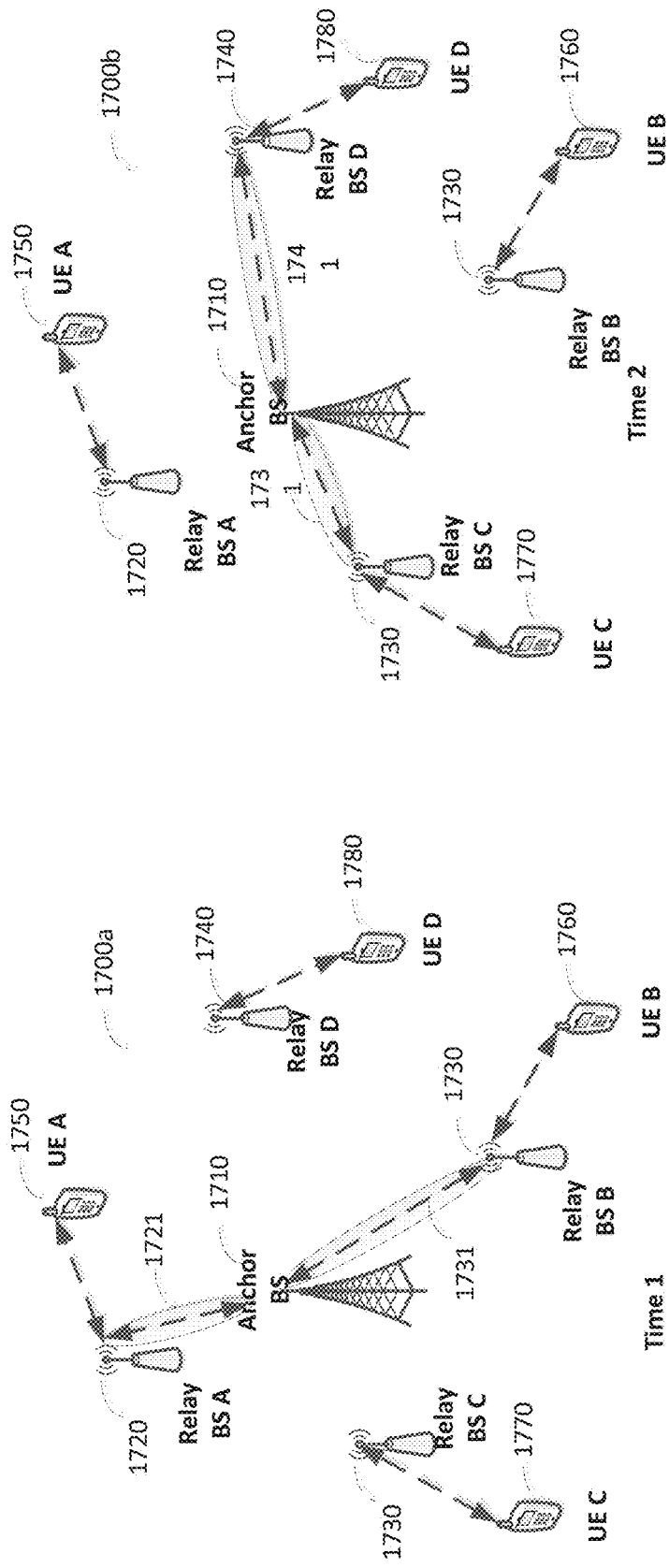
FIGS. 17A and 17B illustrate example space division multiplexings of backhaul frames and access frames based on relay BS groups in accordance with the present disclosure.

FIGS. 17A and 17B illustrate two example space division multiplexings 1700*a*, 1700*b* of backhaul frames and access frames based on relay BS groups in accordance with the present disclosure.

The relay BSs associated with an anchor BS are grouped such that the backhaul transmissions and/or receptions to the relay BSs within a group are performed via spatial-division multiplexing, whereas the backhaul transmissions and/or receptions are orthogonalized between groups via time/frequency division multiplexing. Such grouping is beneficial to minimize multi-user interference among the relay BSs to an acceptable level when the number of relay BSs associated is large compared to the number of antennas at the anchor BS. Relay BS A 1720 and relay BS B 1730 belong to a first SDM group which is active at time 1 as illustrated in FIG. 17A; whereas relay BS C 1740 and relay BS D 1750 belong to a second SDM group which is active at time 2 as illustrated in FIG. 17B. A relay BS group is active when the corresponding backhaul transmission/reception is on-going. For the duration when a relay BS group is not active, the relay BSs belonging to the relay BS group can schedule/perform access transmissions/receptions for its own UEs in a flexible manner (without constraint from the backhaul resource configuration). In certain deployment conditions, full scheduling flexibility by the relay BSs belonging to the inactive relay BS group may not always be possible if significant inter-relay BS interference can occur. In this case, further coordination between the relay BSs to mitigate the inter-relay BS interference can be beneficial. In this disclosure, it shall be assumed that there is full scheduling flexibility by the relay BSs belonging to the inactive relay BS group, but it should not be construed to limit the scope of this disclosure.

Figure 18:
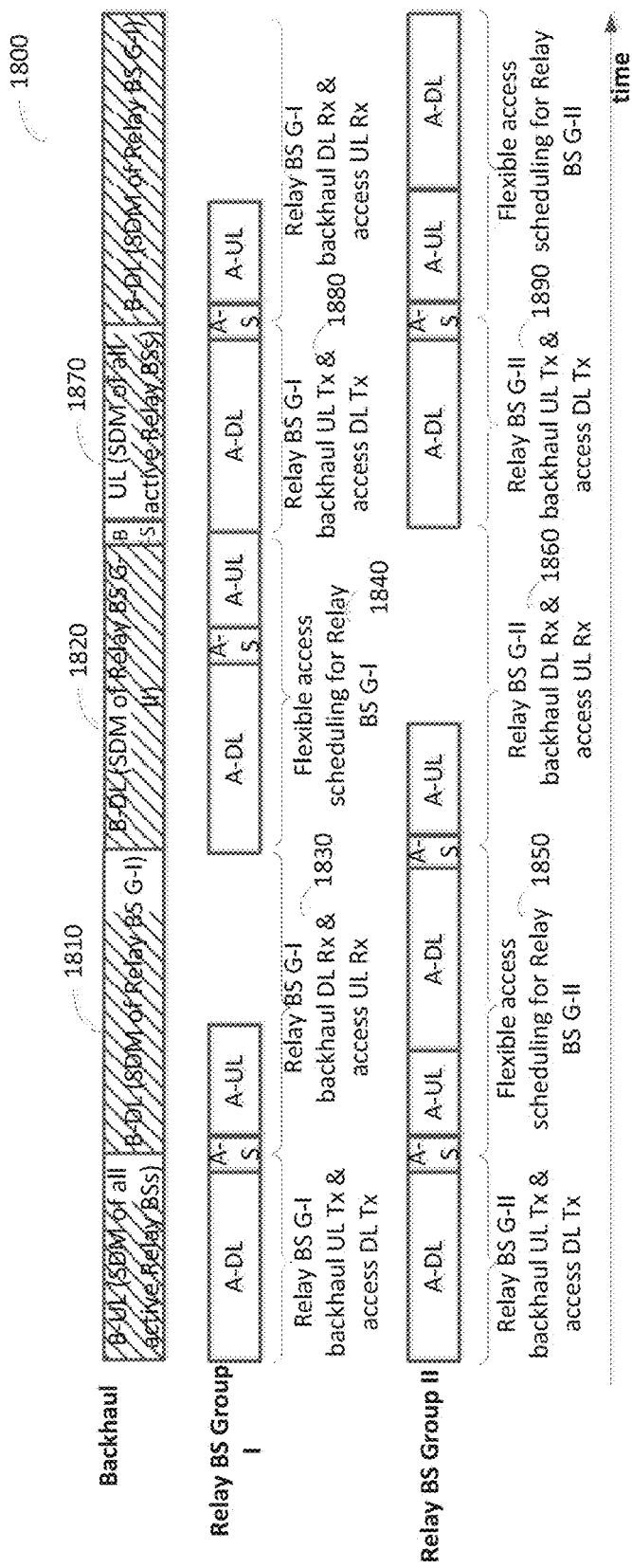
FIG. 18 illustrates an example backhaul and access DL/UL resource allocation in accordance with a spectrum sharing scheme.

FIG. 18 illustrates an example backhaul and access DL/UL resource allocation in accordance with the third method of spectrum sharing scheme when there are multiple relay BS SDM groups according to the present disclosure. In this embodiment, relay BS SDM grouping (Group I and Group II) is performed for the backhaul DL but not the backhaul UL. When the anchor BS is performing backhaul DL transmissions to Group I 1810, the relay BSs belonging to Group I perform backhaul DL reception and access UL reception 1830. Meanwhile, the relay BSs belonging to Group II can perform flexible access scheduling/transmission/receptions for its own UEs 1850. Similarly, when the anchor BS is performing backhaul DL transmissions to Group II 1820, the relay BSs belonging to Group II performs backhaul DL reception and access UL reception 1860. Meanwhile, the relay BSs belonging to Group I can perform flexible access scheduling/transmission/receptions for its own UEs 1840. When the anchor BS is performing backhaul UL reception, the relay BSs for both Group I and Group II perform backhaul UL transmissions and access DL transmissions 1880 & 1890).

Figure 19:
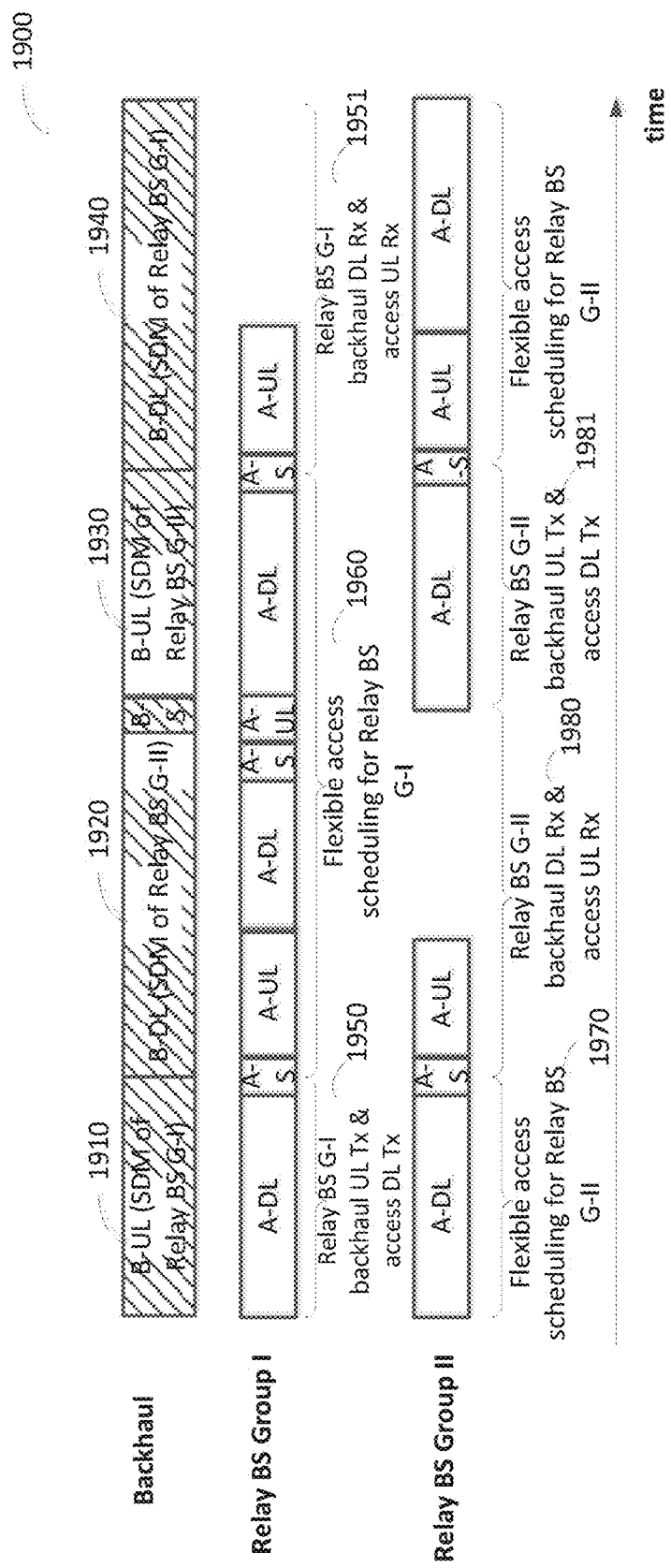
FIG. 19 illustrates another example backhaul and access DL/UL resource allocation in accordance with a spectrum sharing scheme.

FIG. 19 illustrates another example backhaul and access DL/UL resource allocation in accordance with the third method of spectrum sharing scheme when there are multiple relay BS SDM groups according to the present disclosure. In this embodiment, relay BS SDM grouping (Group I and Group II) is performed for both the backhaul DL and the backhaul UL. The description for backhaul DL duration is omitted as it is similar to the description for FIG. 18. When the anchor BS is performing backhaul UL reception for Group I 1910, the relay BSs belonging to Group I perform backhaul UL transmissions and access DL transmissions 1950. Meanwhile, the relay BSs belonging to Group II can perform flexible access scheduling/transmission/receptions for its own UEs 1970. Similarly, when the anchor BS is performing backhaul UL reception for Group II 1930, the relay BSs belonging to Group II performs backhaul UL transmissions and access DL transmissions 1981. Meanwhile, the relay BSs belonging to Group I can perform flexible access scheduling/transmissions/receptions for its own UEs 1960.

In one embodiment, SDM group-specific backhaul resource configuration is signaled to the relay BSs. In one example, a relay BS only receives the backhaul resource configuration pertaining to the group it belongs to. From the relay BS's perspective, the time-frequency resource which is not part of the configured group-specific backhaul resource is available for flexible access scheduling. Anchor BS-Relay BS coordination procedure similar to that illustrated in FIG. 15 can be applied. In another example, each relay BS is signaled a group identity. In addition, the backhaul resource configurations for all relay BS SDM groups are signaled to the relay BS. The relay BS identifies its own backhaul resource from the indicated group identity. The backhaul time-frequency resources configured for the other group identity is available for flexible access scheduling.

In one embodiment, assuming a scheme of SDM of relay BS groups as illustrated in FIG. 17 and example resource allocation schemes as illustrated in FIG. 18 or FIG. 19, when a UE is associated with at least one relay BS in at least two relay BS SDM groups simultaneously, the UE can benefit from additional scheduling flexibility and improvement in spectrum utilization which is not available if the UE were associated with only one relay BS. For example, when one relay BS (of a SDM group) that the UE is associated with is performing backhaul DL reception and UL access reception, the UE can be either transmitting in UL to the relay BS, or it can be receiving on DL from a second relay BS (of another SDM group) that the UE is associated with. The UE can also be transmitting in UL to the second relay BS. In this case, the capability of being scheduled either in DL or UL by the second relay BS can enhance spectrum utilization for the UE.

Figure 20:
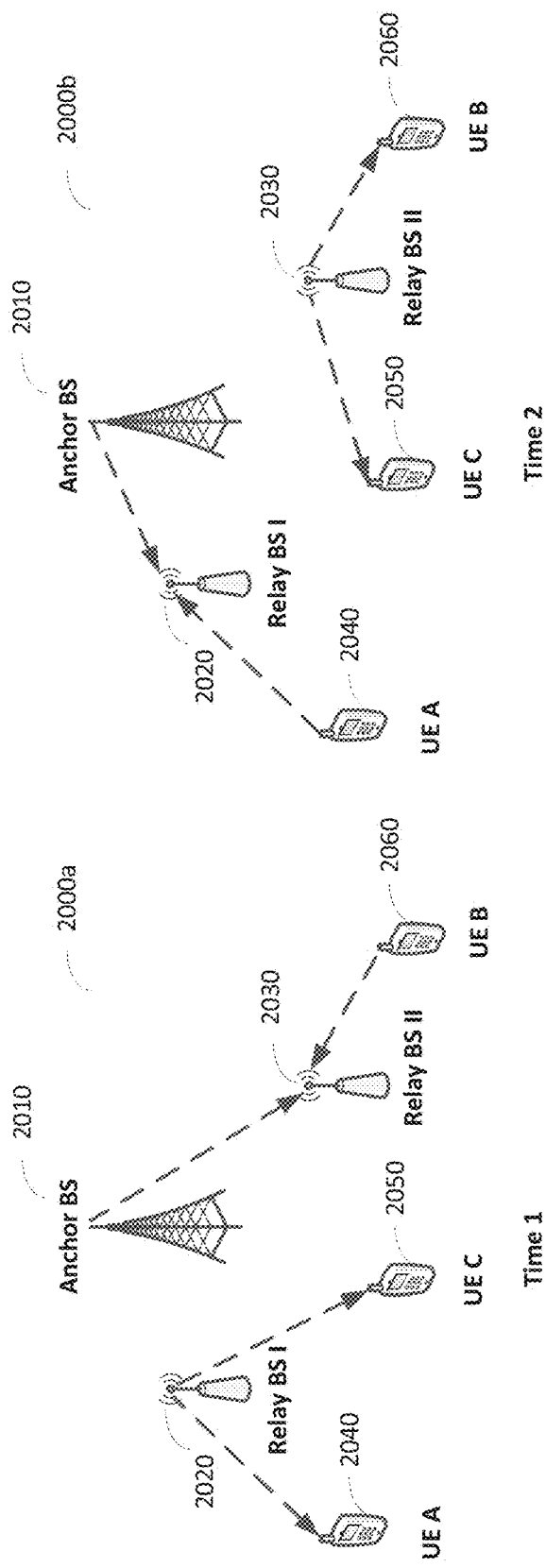
FIG. 20 illustrates an example scenario where a UE can increase DL reception opportunities through association with multiple relay BSs in accordance with the present disclosure.

FIG. 20 illustrates an example scenario where a UE can increase DL reception opportunities through association with multiple relay BSs in accordance with the present disclosure.

Referring to FIG. 20, UE A 2040 is associated with relay BS I 2020, UE B 2060 is associated with relay BS II 2030, and UE C 2050 is associated with both relay BS I 2020 and relay BS II 2030. At time 1 2000*a*, the anchor BS 2010 is transmitting to relay BS II 2030 and UE B is transmitting in UL to relay BS II. Meanwhile, relay BS I is can perform access layer scheduling in a flexible manner; in this example, relay BS I is transmitting in DL to both UE A and UE C. At time 2 2000*b*, the anchor BS 2010 switches to transmit in DL to Relay BS I 2020 and UE A transmits in UL. Meanwhile, relay BS II transmits data in DL to UE B and UE C. In this example, unlike UE A and UE B which can only receive data in DL at a given time, UE C is afforded the flexibility to receive data in DL at both times.

Figure 21:
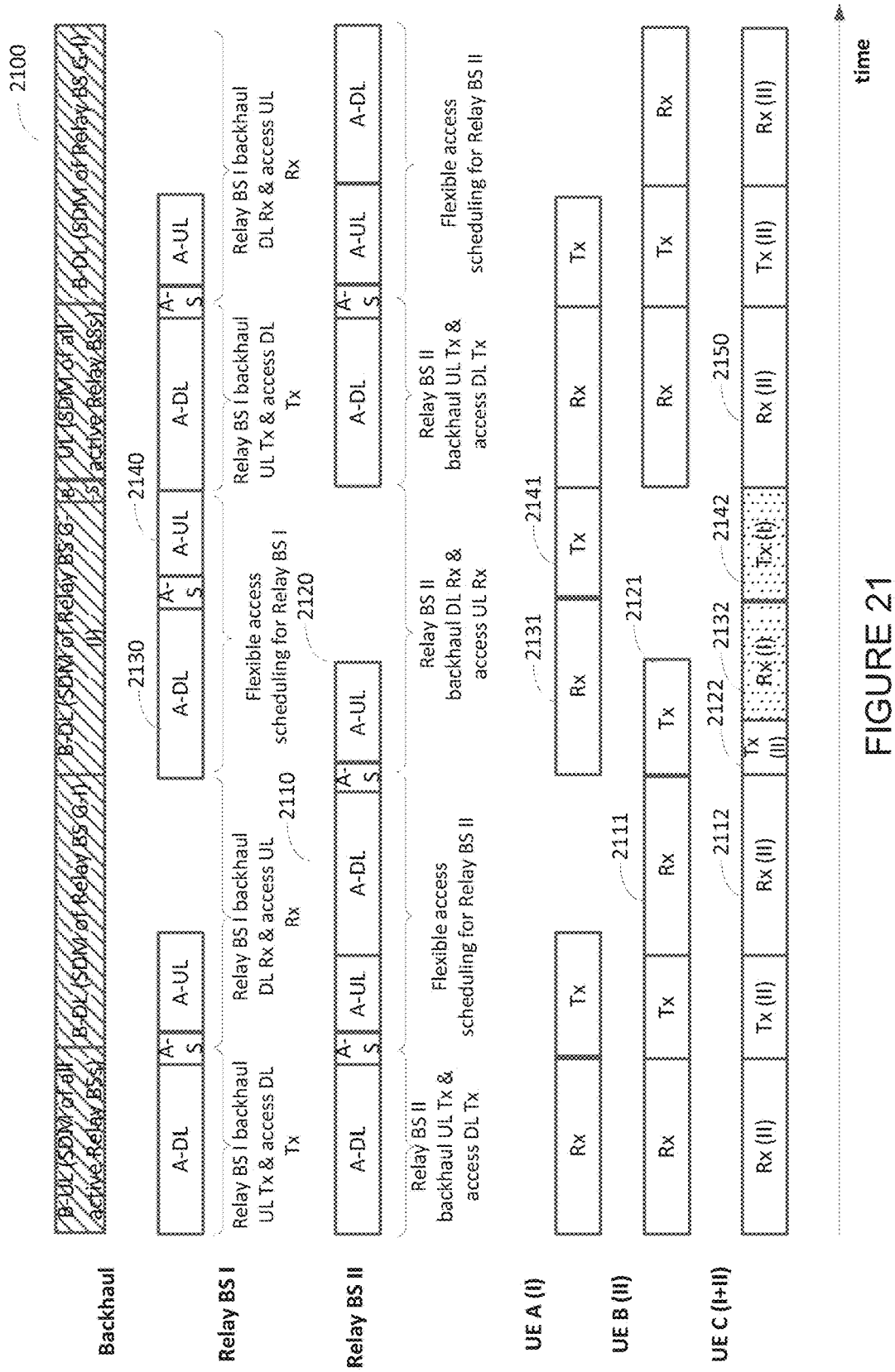
FIG. 21 illustrates another example of improved spectrum utilization and scheduling flexibility for a UE associated with relay BSs from multiple relay SDM groups in accordance with present disclosure.

FIG. 21 illustrates another example of improved spectrum utilization and scheduling flexibility for a UE associated with relay BSs from multiple relay SDM groups in accordance with present disclosure.

Referring to FIG. 21, the SDM scheme is similar to that illustrated in FIG. 18. UE B is associated with relay BS II and UE C is associated with relay BS I and relay BS II. Initially, UE C is receiving and transmitting to relay BS II (such as 2120, 2121, 2122). However, unlike UE B which cannot switch to receive DL data throughout the DL backhaul reception period of relay BS II and has to suspend both DL and UL activities after all UL data has been transmitted, UE C can switch to receive DL data from, and transmit UL data to, relay BS I (2132 and 2142, respectively). Afterwards, UE C can then switch back to communicating with relay BS II (2150).

Figure 22:
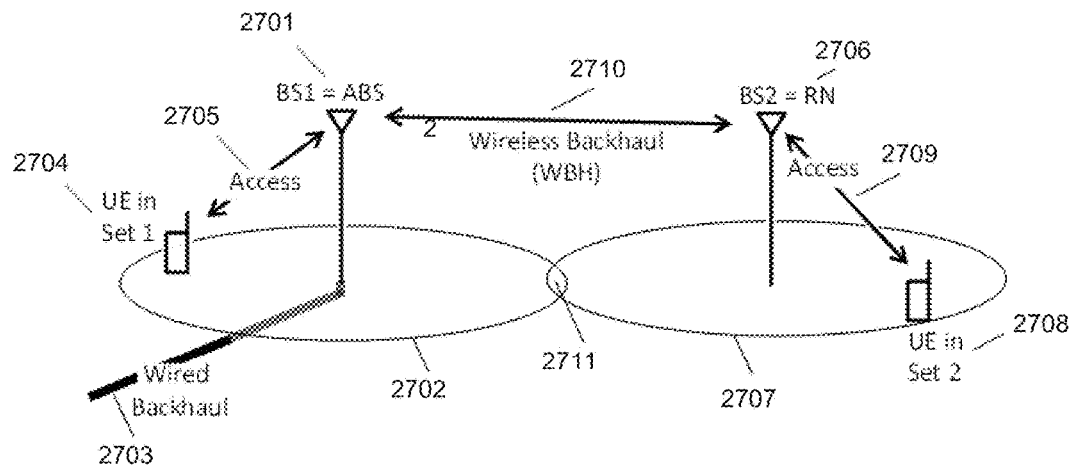
FIG. 22 illustrates an example cellular system consisting of a base station (BS) BS1 in accordance with the present disclosure.

FIG. 22 illustrates an example cellular system consisting of a base station BS1 in accordance with the present disclosure. BS1 2701 provides wireless access to UEs located in a certain geographical coverage area 2702. The set of UEs served by BS1 2701 is referred to as UE Set 1; an example UE that is a member of UE Set 1, i.e., is served by BS1 2701, is identified as UE 2704 in FIG. 22. BS1 2701 transmits information to, and receives information from, UE Set 1 via the wireless access link 2705. The BS-to-UE transmission direction is referred to as the downlink (DL) of the wireless access link 2705. The UE-to-BS transmission direction is referred to as the uplink (UL) of the wireless access link 2705. The DL information that is intended for a particular UE in UE Set 1 arrives at BS1 2701 via the wired backhaul 2703 from the source of the information. As an example, the wired backhaul could comprise an optical fiber connecting BS1 to the infrastructure of an internet service provider (ISP), and thenceforth to the internet, with a website being accessed by the UE being the source of the information. The UL information transmitted by a particular UE to BS1 2701 is transferred to the destination of the information via the wired backhaul 2703. As in the previous example, a website on the internet being accessed by the UE can be the destination of the information.

The cellular system illustrated in FIG. 22 also comprises the BS BS2 2706, providing wireless access to UEs located in a certain geographical coverage area 2707. As indicated by 2711, the coverage areas 2702 and 2707 of BS 2701 and BS 2706 can overlap. The set of UEs served by BS2 706 is referred to as UE Set 2; an example UE that is a member of UE Set 2, i.e., is served by BS2 706, is identified as UE 2708 in FIG. 22. BS2 2706 transmits information to, and receives information from, UE Set 2 via the wireless access link 2709. The definitions of the DL and UL transmission directions with respect to wireless access link 2709 are the same as with respect to the wireless access link 2705.

Unlike BS1 2701, BS2 2706 does not have a wired backhaul. Instead, BS1 2701 provides services to BS2 2706, analogous to those provided to BS1 2701 by the wired backhaul link 2703, via the wireless backhaul link (WBH) 2710. The DL information that is intended for a particular UE in UE Set 2 arrives at BS1 2701 via the wired backhaul 2703 from the source of the information, and is then transferred by BS1 2701 to BS2 706 via the WBH link 2710. Similarly, the UL information transmitted by a particular UE in UE Set 2 to BS2 2706 is transferred by BS2 2706 to BS 2701 via the WBH link 2710, and is subsequently transferred to the destination of the information via the wired backhaul 2703 by BS1 2701. The source and the destination of the information to and from a UE in UE Set 2, respectively, are analogous to the earlier description with respect to the source and destination of the information to and from a UE in UE Set 1, respectively.

Since BS1 2701 relays the information to and from UE Set 2 served by BS2 2706 via the WBH 2710, BS2 2706 is a Relay Node (RN) with respect to BS1 2701, as indicated in 2706 of FIG. 22. The term "RN", which will henceforth be used in the rest of this disclosure, is to be understood in this context. BS1 2701 can be considering as "anchoring" BS2/RN 2706 by providing backhaul services for it. The term "ABS", implying "anchor BS", will be used in the rest of the disclosure; it should be understood to refer to BS1 2701 in the context of FIG. 22.

It can be noted that the cellular system, an example of which is depicted in FIG. 22, can consist of several ABSs and several RNs, each with a coverage region serving a certain UE set, with each RN being anchored by a subset of the ABSs. The communications between each ABS and RN with the set of UEs served by it, respectively, are as described in the context of FIG. 22. Similarly, the communications between each ABS and an RN anchored by it are as described in the context of FIG. 22. Such a cellular system will be referred to in this disclosure as a unified wireless backhaul and access system.

Figure 23:
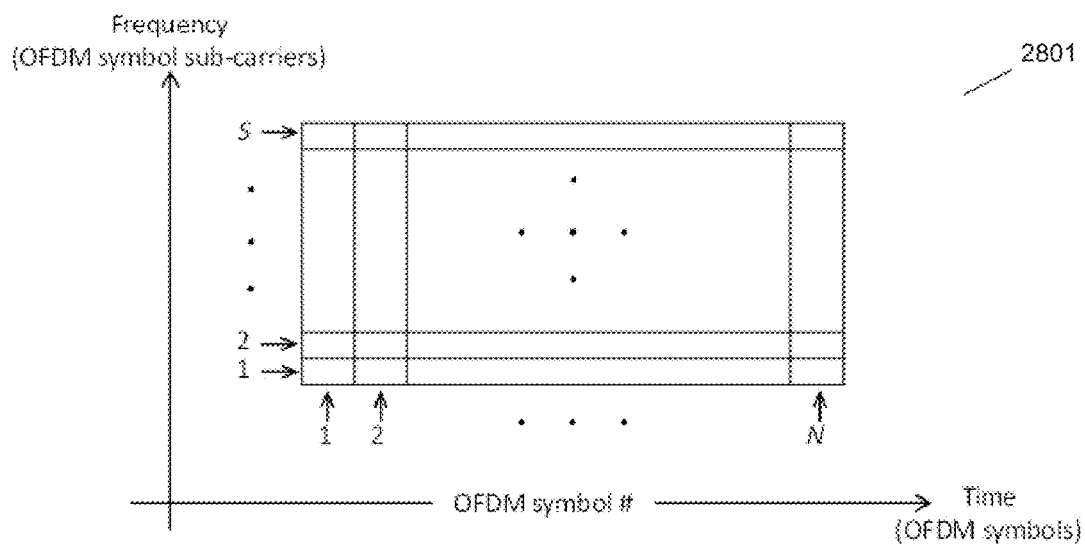
FIG. 23 illustrates a structure of a sub-frame according to present disclosure.

FIG. 23 illustrates a sub-frame according to present disclosure. In the text that follows, "SF" and "sub-frame" will be used inter-changeably. In this figure, the horizontal dimension represents time, whereas the vertical dimension represents frequency. FIG. 23 illustrates a SF 2801 consisting of a time-frequency grid comprising a certain number N OFDM symbols in time, numbered from 1 to N, and a certain number S sub-carriers in frequency, numbered from 1 to S. In another interpretation, SF 2801 consists of N OFDM symbols sequentially arranged in time, where each OFDM symbol consists of S sub-carriers (SCs) in frequency.

In the context of FIG. 22, with respect to ABS 2701, transmissions to and from UEs in UE Set 1 are in time units of SFs. A certain set of OFDM symbols in a SF can be utilized for DL transmissions from ABS 2701 to a UE in UE Set 1, whereas a certain other set of OFDM symbols in the SF can be utilized for UL transmissions from UEs in UE Set 1 to ABS 2701. Analogous descriptions apply in the context of FIG. 7 to RN 2706 with respect to transmissions to and from UEs in UE Set 2.

Figure 24:
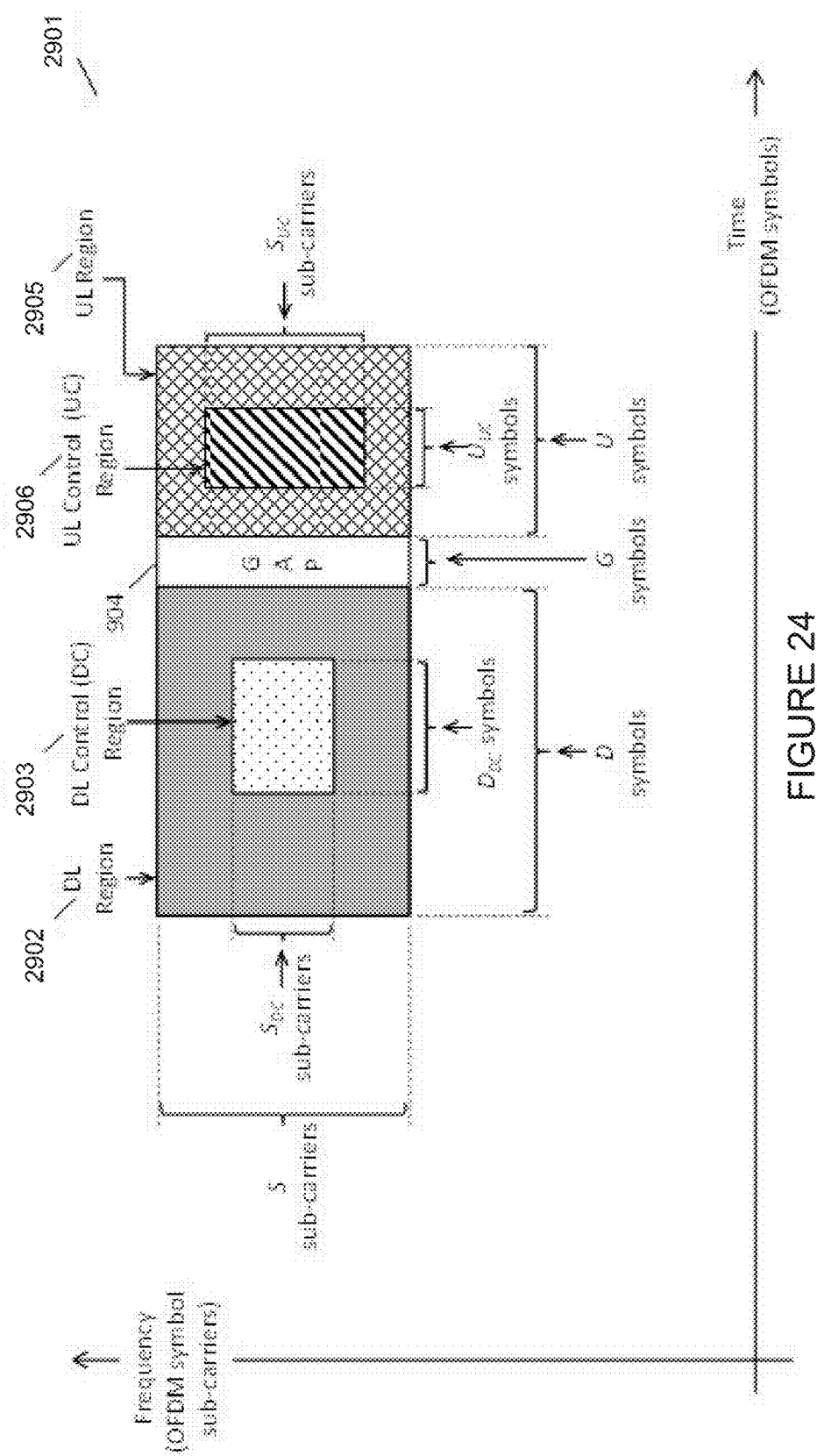
FIG. 24 illustrates a SF with DL and UL transmission regions in accordance with the present disclosure.

FIG. 24 illustrates a SF 2901 with DL and UL transmission regions in accordance with the present disclosure. The following descriptions refer to communications between a BS and a set of UEs; in the context of FIG. 22, the BS can refer to either the ABS 2701 or the RN 2706, while the set of UEs can refer to UEs in UE Set 1 or in UE Set 2. SF 2901 consists of a time-frequency grid comprising a certain number (D+G+U) OFDM symbols in time, and a certain number S sub-carriers in frequency. In another interpretation, SF 2901 consists of a number (D+G+U) OFDM symbols sequentially arranged in time, where each OFDM symbol consists of S sub-carriers in frequency. SF 2901 consists of the followings.

1. A DL region 2902, consisting of D sequential OFDM symbols. The BS transmits to the UEs in the DL region.

2. A DL control region 2903 within the DL region 2902, occupying $S_{DC}$ sub-carriers in each of $D_{DC}$ symbols in the DL region. The DL control region is used to transmit control information from the BS to the UEs. The contents of the DL control region are elaborated upon further in the description below.

3. The portion of the DL region 2902 outside of the DL control region is referred to as the DL data region. The DL data region is used to transmit user information from the BS to the UEs. The contents of the DL data region are elaborated upon further in the description below.

4. A gap region 2904 consisting of G sequential symbols in which no transmissions occur. Such a gap can be utilized by the BS and the UEs to transition from transmitting and receiving information to receiving and transmitting information, respectively.

5. A UL region 2905 consisting of U sequential symbols. The UEs transmit to the BS in the UL region.

6. A UL control region 2906 within the UL region 2905, occupying $S_{UC}$ sub-carriers in each of $U_{UC}$ symbols in the DL region. The UL control region is used to transmit control information from the UEs to the BS. The contents of the UL control region are elaborated upon further in the description below.

7. The portion of the UL region 2905 outside of the UL control region is referred to as the UL data region. The UL data region is used to transmit user information from the UEs to the BS. The contents of the UL data region are elaborated upon further in the description below.

8. Each symbol in the DL and UL regions can have a different number of occupied subcarriers. In other words, each symbol in the DL region can have a different number of subcarriers on which the BS transmits to the UEs, and likewise, each symbol in the UL region can have a different number of subcarriers on which any of the UEs transmit to the BS.

9. In some embodiments, the time order of the regions in SF 2901 can be the UL region, followed by the gap and followed by the DL region.

10. In some embodiments, the DL region can consist of sets of non-contiguous symbols, wherein each such set may or may not contain a further subset of symbols, within the set of symbols, containing a DL control region. Similarly, the UL region can consist of sets of non-contiguous symbols, wherein each such set may or may not contain a further subset of symbols, within the set of symbols, containing a UL control region. There can also be multiple gaps in the SF.

11. In some embodiments, the SF 2901 can consist of only a DL region, i.e., such that G=U=0; furthermore, the DL region may or may not contain a DL control region. In some further embodiments, the SF 2901 can consist of only a UL region, i.e., such that D=G=0; furthermore, the UL region may or may not contain a UL control region.

12. In some embodiments, the DL control region 2903 can occupy all the SCs in the DL region 2902. Similarly, in some embodiments, the UL control region 2906 can occupy all the SCs in the UL region 2905.

The contents of the various regions in SF 2901 are described in the following A to F.

- A. The DL control region 2903 can contain several DL control channels. A DL control channel, transmitted from a BS to a UE, informs the UE about details of the DL data region, the UL data and/or control regions, and/or further DL control regions, such as the location in the SF and the modulation & coding scheme (MCS) used for the transmission of that region. The time-frequency region corresponding to each DL control channel can include subcarrier locations with pilot or reference samples to aid the UEs in obtaining system timing and correct for hardware impairments, such as the mismatch between the oscillator frequencies of the UE and the BS, as well as to perform channel estimation to aid in the demodulation and decoding of the control channel.
- B. A DL control channel in a particular SF can include Ack-Nack feedback for UL data transmissions in previous or current SF(s).
- C. The term PDCCH (physical downlink control channel) will be used to refer to a particular DL control channel. i. The DL control region 2903 can at least partly consist of a first set of PDCCHs, wherein each PDCCH in the set contains information that has relevance to, i.e., is recoverable by (can be demodulated, decoded and interpreted) a specific UE among a first set of UEs. Furthermore, the DL control region 2903 can at least partly consist of a second set of PDCCHs, each of which has relevance to each UE in a second set of UEs, which may or may not overlap with the first set. The first and second set of PDCCHs are referred to as the unicast and multicast PDCCHs, respectively. ii. The location of a PDCCH in the time-frequency grid can be conveyed to a UE served by that PDCCH via semi-static RRC signaling. Alternatively, the PDCCH can recur at known frequency locations according to a time schedule defined in the system specifications. Alternatively, the location of the PDCCH can be indicated by a different control channel occurring in the DL control region 2903. Similarly and in addition, the MCS used to encode and modulate the PDCCH is one out of a set of MCSs defined in the system specifications and known to the UE. The mapping to the time-frequency grid of the control region 903 of the modulated samples of the control information portion of relevance to the UE is also known to the UE. iii. The UE can know search over the DL control region for PDCCHs targeted to it, by using various hypothesis about the PDCCH information size in number of bits, the MCS used to encode the PDCCH information, as well as the location of the PDCCH within the DL control region. Such a process is referred to as blind decoding.
- D. On the uplink, Ack/Nack (A/N) or CSI feedback can be configured to be transmitted in the UL Control region 2906. A/N refers to the ack-nack feedback from a UE regarding the reception success or failure of a downlink data packet. As with the DL control region, the UL control region can include subcarrier locations with pilot or reference samples to aid the BS in correcting for mismatch between the oscillator frequencies of the UE and the BS, as well as to perform channel estimation to aid in the demodulation and decoding of the UL control channels.
- E. The DL data region contains user information transmissions from the BS to the UE. The term PDSCH (physical downlink shared channel) will be used in this disclosure to refer to a data channel transmitted by the BS to a UE in the DL data region. The time-frequency grid used to transmit a PDSCH to a particular UE can contain subcarrier locations with pilot or reference samples to aid the UE in performing channel estimation to aid in the demodulation and decoding of the PDSCH. The term UE-RS is used to refer to such UE-specific reference samples. i. A data packet (or transport block), which is carried by the SCs in the data channel, refers to a set of modulation symbols, that are the result of a modulation and an encoding operation on a set of bits consisting of a set of information bits and a set of CRC bits appended to the set of information bits. Each CRC bit is a certain linear combination of the information bits. After performing the decoding operation at the UE, the UE can determine if the packet was received correctly by calculating the CRC bits from the decoded information bits and comparing them to the transmitted CRC bits. A match between the transmitted CRC bits and the CRC bits calculated from the received information bits leads to the data packet being declared as having been received correctly. ii. A data packet (or a transport block) can be transmitted within a SF or a set of SFs. Both the BS and the UE for which the data packet is intended have knowledge about the mapping between the data packet bits and the SFs; such a mapping can be indicated by the BS to the UE via the PDCCH.
- F. The structure of the UL data region and associated operations are analogous to the corresponding structure and operations with respect to the DL data region. The term PUSCH (physical uplink shared channel) will be used in this disclosure to refer to a data channel transmitted by a UE to the BS in the UL data region. The structure of a UL data packet (or transport block) is analogous to that of a DL data packet.

In the context of the terminology and definitions of FIG. 22, and utilizing the terminology and definitions in the context of FIG. 24, embodiments disclosing the structures, information content and the corresponding processing by the ABS and RN of the ABS and RN SFs are described next.

Before a detailed description of the embodiments, a summary of the ABS and RN actions and outcomes with respect to the operation of the unified wireless backhaul and access system, as described in the context of FIG. 22, is as follows.

First, the ABS and RN SFs have the same time duration, and are synchronized in time (up-to the signal propagation delay between the ABS and the RN). Each ABS and RN SF begin and end at the same time (up-to the signal propagation delay between the ABS and the RN).

Next, the ABS, treating the RN as a logical entity akin to a UE in UE Set 1 that it serves, transmits a PDCCH to the RN, utilizing a region in the downlink control portion of the ABS SF that is known to the RN. The PDCCH can inform the RN about: a. Whether the ABS will transmit a PDSCH, containing backhaul information for UE Set 2 served by the RN, to the RN during that SF or in following SFs, along with the details of the PDSCH transmissions, such as the beginning and ending SFs for the transmissions, the resource allocation in the time-frequency grid in each of the SFs, the modulation and coding scheme (MCS), the number of streams as well as the pre-coder used. b. Whether the RN is to transmit a PUSCH to the ABS during that SF or in following SFs, containing information from UE Set 2, served by the RN, to be transferred to the destination of the information via the ABS wired backhaul, and/or a request for resources on the WBH from the RN, along with the details of the PUSCH transmissions, such as the beginning and ending SFs for the transmissions, the resource allocation in the time-frequency grid in each of the SFs, the modulation and coding scheme (MCS), the number of streams as well as the pre-coder to be used. c. The structure of the ABS SF or the following sequence of ABS SFs, along with information about the occurrence of the next ABS PDCCH directed to the RN, or occurrence of the next ABS SF that should be monitored for potential ABS PDCCH directed to the RN. d. The schedule the RN is to follow, with respect to PDSCH/PUSCH resource allocation grants with respect to UE Set 2, in future SFs. The ABS can thus instruct and drive the resource allocations in the RN SF, to allow for better interference coordination between the ABS and RN SFs.

Thereafter, the RN, on receiving the PDCCH from the ABS, can perform the following actions driven by the control information in the PDCCH. The timeline of these actions can be driven by the PDCCH as well. (a) Configure the RN SFs for communication with the ABS and/or a subset of UEs in UE Set 2, and inform the relevant subset of UEs in UE Set 2 about the details of forthcoming communications via PDCCH transmissions in the relevant RN SFs. (b) Receive backhaul data via a PDSCH transmission from the ABS, possibly accompanied by simultaneous reception of PUSCH transmissions from UEs in UE Set 2. (c) Transmit backhaul data via PUSCH transmissions to the ABS, possibly accompanied by simultaneous PDSCH transmissions to UEs in UE Set 2. d. Transmit PDSCHs to, and/or receive PUSCHs from, UEs in UE Set 2. e. Follow the commands from the ABS with respect to future PDSCH/PUSCH resource allocation grants with respect to UE Set 2.

Embodiments Set 1: DL Control Region Structure in SF Periods with ABS-to-RN PDCCH Transmission This set of embodiments describes, for ABS SFs in which the ABS transmits a PDCCH to the RN, the DL control channel structure of the ABS SF, the locations and content of the PDCCH transmitted by the ABS to the RN, and the related RN SF structure and RN actions. In this set of embodiments, the disclosed RN actions are driven by the knowledge that the ABS can be transmitting a PDCCH to it; techniques for RN acquisition of the information regarding which ABS SFs can have RN-targeted PDCCH transmissions are disclosed in Embodiment Set 2.

In this set of embodiments, for ABS SFs containing a PDCCH targeted to an RN, the RN reception of the PDCCH corresponds to a gap region in the RN SF. Additionally, the PDCCH transmission region is in the beginning of the ABS SF, ensuring that the RN reception of the PDCCH is as early as possible in the SF duration. This enables as much as possible of the RN SF to be utilized by the RN to serve its UE set.

Figure 25A:
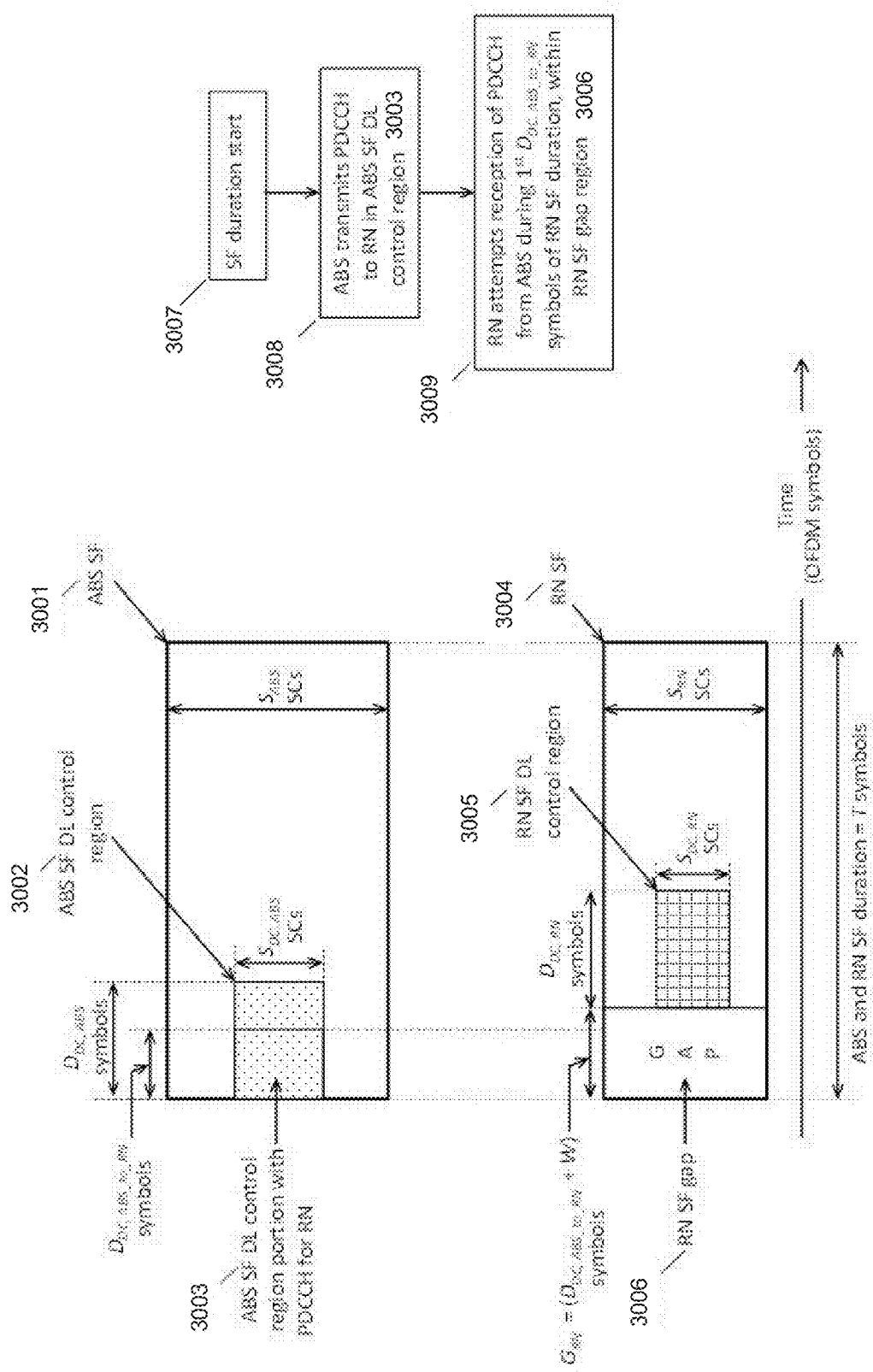
FIGS. 25A and 25B illustrate ABS-to-RN PDCCH transmission in SF Periods in accordance with the present disclosure.
Figure 25B:
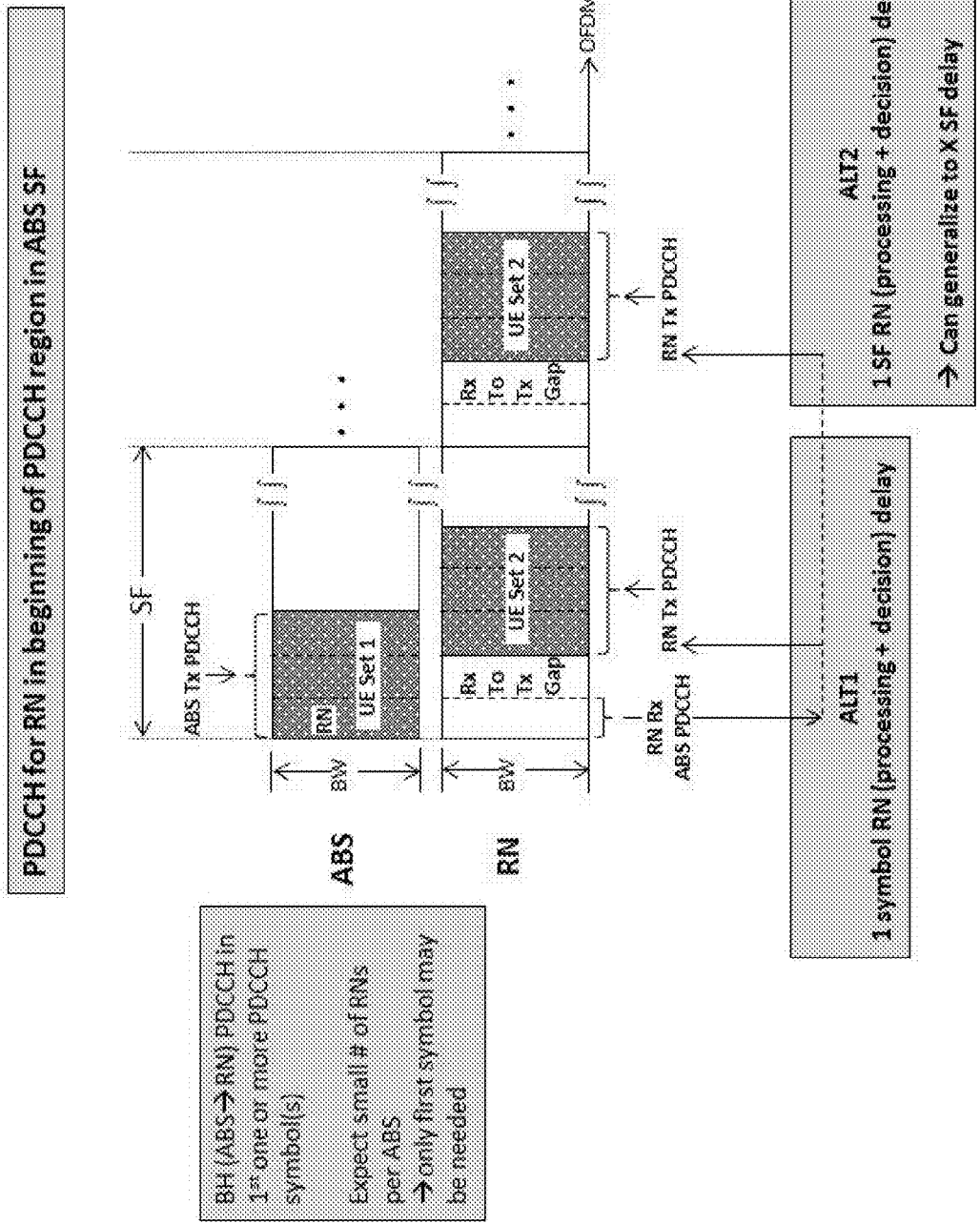

FIGS. 25A and 25B illustrate ABS-to-RN PDCCH transmission in SF periods in accordance with the present disclosure.

As illustrated in FIG. 25A, ABS SF 3001 and RN SF 3004 are both a number T OFDM symbols in duration, and are synchronized in time up-to the signal propagation delay between the ABS and the RN (which is the same as the propagation delay between the RN and the ABS). ABS SF 3001 occupies a maximum $S_{ABS}$ SCs in frequency, and contains a DL control region 3002 occupying $S_{DC,ABS}$ contiguous SCs in frequency and $D_{DC,ABS}$ symbols in time starting from the beginning of the SF. The ABS can transmit a PDCCH to an RN that it is associated with. All the RN-targeted PDCCHs transmitted by the ABS are located within the region 3003, which is a sub-region within the ABS downlink control region 3002, occupying the first $D_{DC,ABS\_to\_RN}$ symbols within the region 3002.

For SF durations in which the ABS SF transmits a PDCCH to an RN, as illustrated in the FIG. 25A for the ABS SF 3001, the SF of the targeted RN, as illustrated by the RN SF 3004, occupies a maximum $S_{RN}$ SCs in frequency, and contains a gap region 3006 in the first $(D_{DC,ABS\_to\_RN}+W)$ symbols of the SF, with the number W being zero or a positive integer. As explained in the context of FIG. 22, no communications occur in the gap region 1006 between the RN and UE Set 2, the set of UEs served by it. The RN DL control region 3005 occupies $D_{DC,RN}$ symbols following the gap region in time, and $S_{DC,RN}$ SCs in frequency. The RN DL control region, as explained earlier, can contain PDCCHs transmitted by the RN to UE Set 2. In some embodiments, the ABS DL control region with a PDCCH for the RN can be located in a different portion of the ABS SF 3001.

The actions of the ABS and the RN with respect to PDCCH transmission and reception, respectively, are elaborated upon in 3007 to 3009. As in 3008, the ABS transmits a PDCCH to an RN in the region 3003 of the ABS SF, which is the sub-portion of the DL control region 3002 that contains all RN-targeted PDCCH transmissions by the ABS. In 3009, the RN attempts PDCCH reception using knowledge of the number of symbols $D_{DC,ABS\_to\_RN}$ during which the ABS can transmit a PDCCH to it, as well as the frequency occupancy $S_{DC,ABS}$ SCs of the PDCCH. Such a reception would involve a search in the time-frequency region of 3003 with respect to the set of possible PDCCH packet sizes and modulation and coding schemes defined in the operating specifications. The RN would determine the success of the PDCCH reception via a successful CRC check on the decoded PDCCH bits, as explained earlier in this disclosure. A lack of a successful CRC check over reception attempts over all of the PDCCH structure hypotheses would indicate, to the RN, either a PDCCH reception failure, or the absence of a PDCCH transmission to the RN in that SF duration.

Some embodiments can employ some or all of the following specific parameter value settings. 1. $S_{DC,ABS}=S_{ABS}$, i.e., the DL control region in the ABS SF occupies all SCs in the first $D_{DC,ABS}$ symbols of the SF. 2. $S_{RN}=S_{ABS}$, i.e., the RN SF occupies the same maximum number of SCs, i.e., the same bandwidth, as the ABS SF. 3. $S_{DC,RN}=S_{RN}$, i.e., the DL control region in the RN SF occupies all SCs in the first $D_{DC,RN}$ symbols of the SF. 4. $D_{DC,ABS}=1$, 2 or 3 symbols, $D_{DC,ABS\_to\_RN}=1$ or 2 symbols, and W=0 or 1 symbol. In other words, the DL control region of the ABS SF occupies up-to 3 symbols, out of which the $1^{st}$ or $1^{st}$ two (in case $D_{DC,ABS}>1$) can contain RN-targeted PDCCHs, with the corresponding gap region in the RN SF being of a 2 or 3 symbol durations, respectively.

FIG. 25B illustrates two schemes for ABS-to-RN PDCCH transmission. In ALT 1, The ABS and RN SFs have the same time duration, and are synchronized in time up-to the signal propagation delay between the ABS and the RN. In ALT 2, the RN is informed about the SF periods and/or the periodicity of occurrence of ABS SFs where the ABS can transmit PDCCHs to the RNs, which is described in below embodiments set 2.

Embodiments Set 2: Indication to RN of SF Periods with ABS-to-RN PDCCH Transmission This set of embodiments discloses techniques using which the RN can gain a knowledge of the location of the ABS SFs during which the ABS can transmit a PDCCH to it, as well as the values of the ABS SF parameters $D_{DC,ABS\_to\_RN}$ symbols and $S_{DC,ABS}$ SCs disclosed in the context of FIGS. 25A and 25B in Embodiment Set 1.

According to some embodiments in this set, the system specifications can define the SF periods and/or the periodicity of occurrence of ABS SFs where the ABS can transmit PDCCHs to the RNs, possibly via a formula using which such SF periods can be identified via a knowledge of the system frame or SF index. The system specifications can also further define the values or set of values for the $D_{DC,ABS\_to\_RN}$ and $S_{DC,ABS}$ parameters applicable to those ABS SFs. The ABS, upon an initial association with the RN as explained earlier, can transmit PDCCHs to the RN in such SF periods. The RN, upon initial power-up, timing acquisition and synchronization to the system and association with the ABS as explained earlier, can similarly search for and attempt to receive such PDCCH transmissions during such SF periods.

According to some embodiments in this set, the RN can be informed about the SF periods and/or the periodicity of occurrence of ABS SFs where the ABS can transmit PDCCHs to the RNs, and/or the values or set of values for the $D_{DC,ABS\_to\_RN}$ and $S_{DC,ABS}$ parameters applicable to those ABS SFs, via higher layer signaling, possibly conveyed to the RN via PDSCH transmissions from the ABS to the RN over the WBH, such as part of RRC configuration, or as part of system information broadcast. In another option, the aforementioned information about the ABS PDCCH region for the RNs can be broadcast in a common broadcast channel such as PBCH.

Figure 26A:
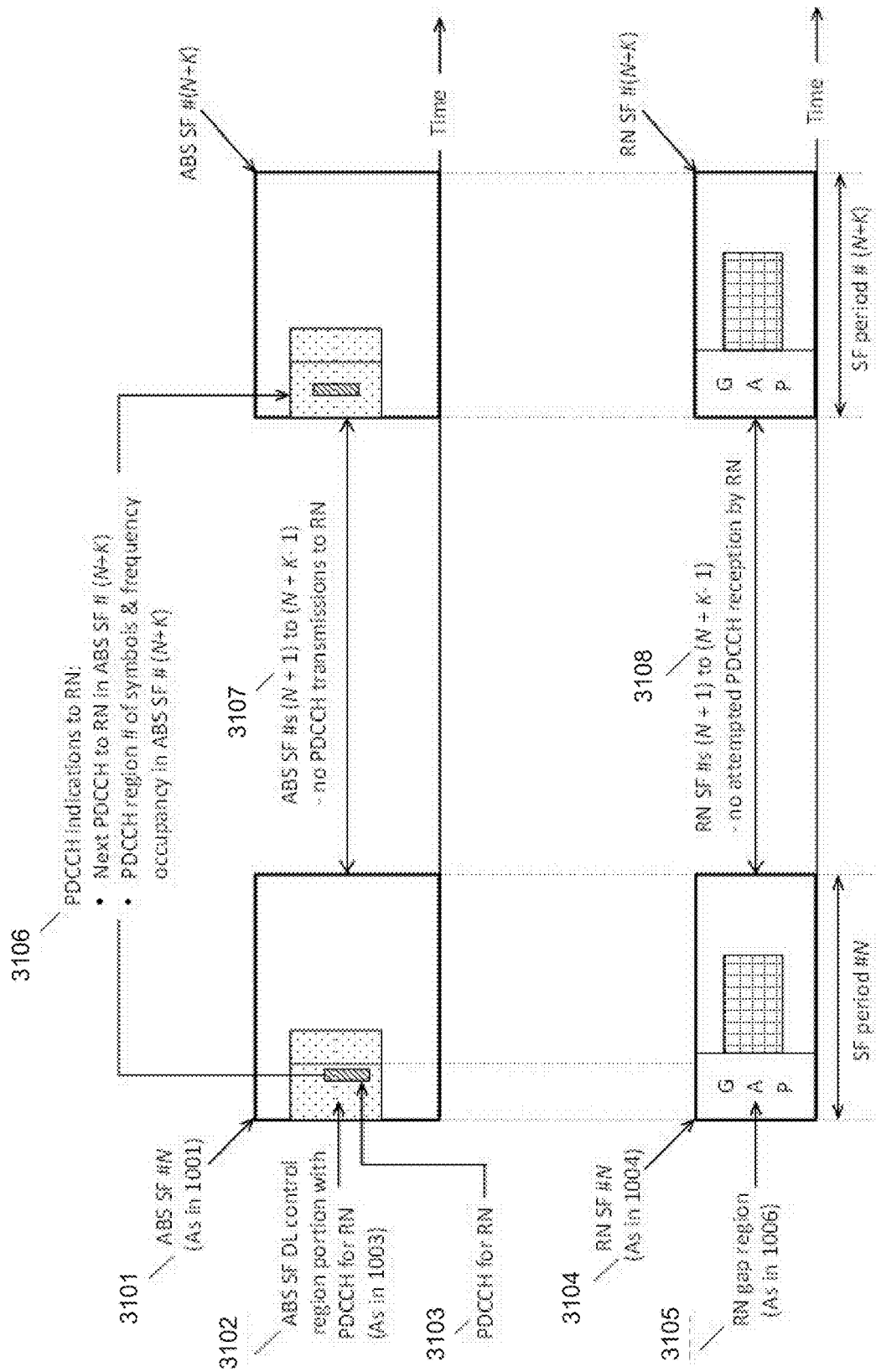
FIG. 26A to 26B illustrate example ABS-to-RN PDCCH transmissions in SF periods in accordance with the present disclosure.
Figure 26B:
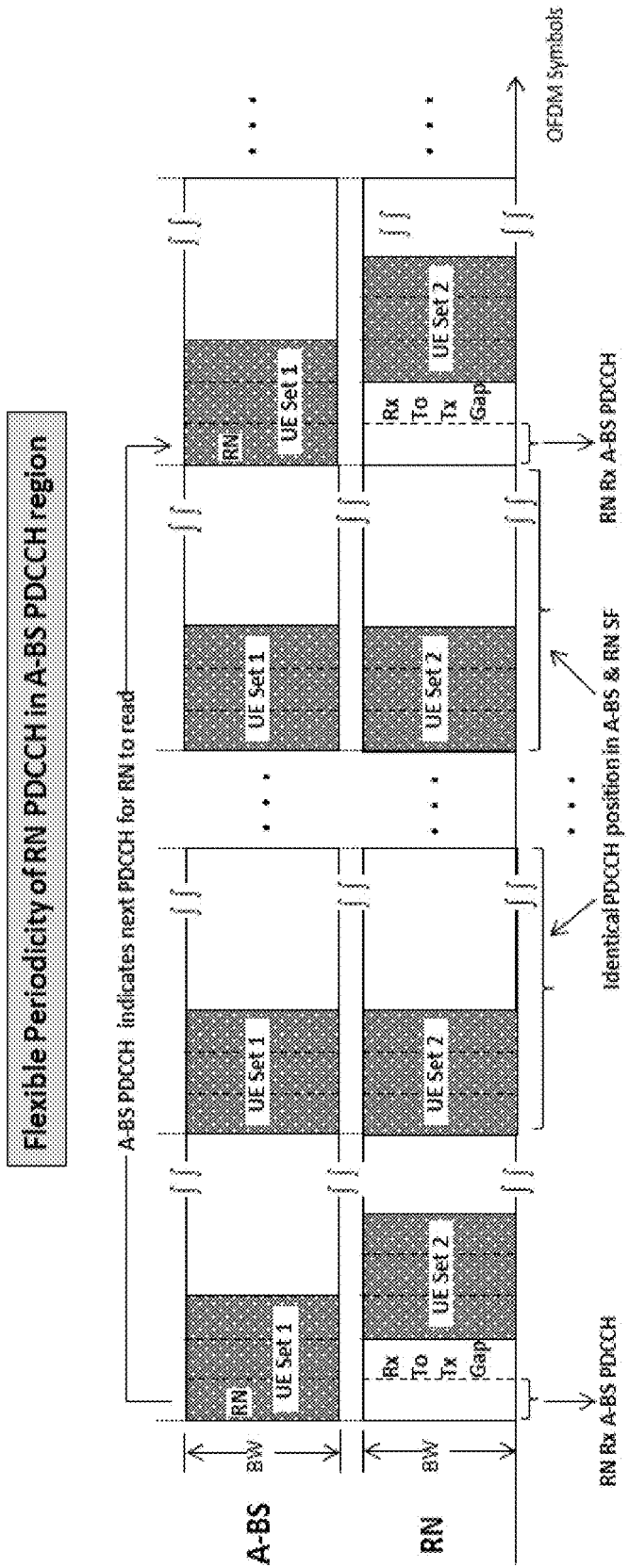

FIG. 26A to 26B illustrate example ABS-to-RN PDCCH transmissions in SF periods in accordance with the present disclosure.

According to some embodiments in this set, a PDCCH transmitted from the ABS to the RN can contain an indicator informing the RN about the occurrence of the next or next set of ABS SFs with possible PDCCH transmissions to the RN. This is illustrated in FIG. 26A to 26D. In FIG. 26A, ABS SF 3101 transmits a PDCCH 3103 to the RN, using a portion of the DL control region 2902; the structure of the ABS SF 3101 and the RN-targeted PDCCH portion 3102 are as elaborated upon with respect to items 3001 and 3003 in the context of FIG. 25, respectively. The RN attempts to receive the PDCCH transmission during the gap region 3104 of the RN SF 3104. Both the ABS SF 3101 and the RN SF 3104 correspond to SF index #N in the sequence of SF time period indices. In one example, the PDCCH containing the indicator is a common PDCCH whereby it can be received by multiple RNs such as the case when the CRC is addressed with a common RNTI known to the multiple RNs. In another example, the indicator can be included in the PDCCH for DL assignment or UL grant for the RN.

As in 3106, the PDCCH 3103 contains an indicator or set of indicators, informing the RN about the following.

The ABS SF# containing the next PDCCH transmission to the RN; in the illustration in FIG. 26A, this is shown to be the ABS SF # (N+K), where the value K is at least 1. In other words, the PDCCH in a particular ABS SF can indicate to the RN the location of the PDCCH in a future ABS SF, starting from the next SF in time order.

The structure of that ABS SF, in terms of the $D_{DC,ABS\_to\_RN}$ and $S_{DC,ABS}$ parameters defining the symbol and subcarrier region that the RN would need to search over when attempting to receive the PDCCH.

In some embodiments, the PDCCH 3103 can contain the following indicators with respect to future PDCCH transmissions to the RN. (a) A certain number P of future ABS SFs with PDCCH transmissions to the RN, a set of P respective time indices for these ABS SFs relative to the time index N of ABS SF 3101, as well as the set of P respective $D_{DC,ABS\_to\_RN}$ and $S_{DC,ABS}$ parameters defining the symbol and subcarrier region that the RN would need to search over when attempting to receive the PDCCH over each of these ABS SFs. Alternatively, the PDCCH can indicate the values of the $D_{DC,ABS\_to\_RN}$ and $S_{DC,ABS}$ parameters, and additionally indicate that those values apply to each of the P indicated future ABSs. The value of P can be as small 1. (b) A periodic occurrence of future ABS SFs with PDCCH transmissions to the RN, with a certain period P in terms of number of SF durations. In other words, the PDCCH in ABS SF 3101 can indicate that the next PDCCH transmission would occur in ABS SF #s (N+P), (N+2*P), (N+3*P), and so on, with an additional indication of the values of the $D_{DC,ABS\_to\_RN}$ and $S_{DC,ABS}$ parameters applicable to these ABS SFs. The period P can be as small as 1. Additionally, the PDCCH 3103 can indicate a number M of such periodic future ABS SF occurrences. In other words, the PDCCH in ABS SF 3101 can indicate that the next PDCCH transmission would occur in ABS SF #s (N+P), (N+2*P), (N+3*P), up-to a final appearance according to the indicated sequence in ABS SF # (N+M*P). The number M of future such ABS SF occurrences can be as small as 1.

Further, in accordance with the indication by the PDCCH 3103 to the RN 3106, as in 3107, the ABS does not transmit a PDCCH to the RN in any of the ABS SF#s (N+1) to (N+K−1). It can be noted that the ABS can transmit a PDCCH to a different RN that it is associated with in ABS SF#s (N+1) to (N+K−1), in accordance with indications about ABS SFs containing PDCCH transmissions made by the ABS to that RN.

In accordance with the indication by the PDCCH 3103 to the RN 3106, as in 3107, the RN does not attempt any PDCCH reception during the SF duration index #s (N+1) to (N+K−1). After SF #N, the RN makes its next PDCCH reception attempt, as indicated by the PDCCH 3103 in SF duration index #N, in SF duration index #(N+K).

In the event that the RN is unable to successfully receive the PDCCH transmission indicated by a previous ABS PDCCH, it can search for and attempt to receive the PDCCH during SF periods defined in the specifications or as indicated to the RN via higher-layer signaling, as explained earlier in this section.

FIG. 26B illustrates the same ABS-to-RN PDCCH transmission in SF periods as FIG. 26A except that the PDCCH occupies a whole OFDM symbol.

Embodiment Set 3: Contents of the ABS-to-RN PDCCH

This set of embodiments discloses the contents of the PDCCH transmitted from the ABS to the RN, as well as the RN actions in response to such PDCCH control information. In summary, the contents of the PDCCH can be all or a subset of the following 1 through 8:

1. A Transmission_Code parameter, indicating to the RN if there is a forthcoming transmission from the ABS, or a request for a transmission from the RN to the ABS. The Transmission_Code parameter can be implicitly indicated by the DCI format of the PDCCH for the RN. The Transmission_Code parameter can also be explicitly indicated by information bits in the PDCCH for the RN.

2. An Action_Time_Start parameter, indicating to the RN the start time of the transmissions as indicated by the Transmission_Code.
3. An Action_Time_End parameter, indicating to the RN the end time of the transmissions as indicated by the Transmission_Code.
4. A Resource_Allocation parameter, informing the RN about the resources to be used for the transmissions indicated by the Transmission_Code parameter, and in the SFs indicated by the Action_Time_Start and Action_Time_End parameters.
5. Parameters informing the RN about the next ABS SF or SFs containing the next PDCH or PDCCHs for the RN, as well as the structure of the control region in these SFs. These parameters are as described with respect to Embodiment Set 2 in this disclosure.
6. An ABS_SF_DL_UP_Gap_Struct parameter, informing the RN about the transmission structures of all the ABS SFs, starting from the current one and up-to the next ABS SF containing a PDCCH for the RN. Specifically, for each of those ABS SFs, this parameter specifies the symbols within the SF used for DL or UL transmissions, as well as the gap symbols in the SF. This information aids the RN in determining the DL, UL and gap regions of the RN SFs with respect to communications with UEs in UE Set 2, which it is serving. The RN can choose to align the structure of the RN SFs with respect to the component DL, UL and gap regions with those of the corresponding ABS SFs occurring at the same time in order to minimize interference to its communications with UEs in UE Set 2.
7. An RN_SF_DL_UL_Struct parameter, informing the RN about the transmission structure of some RN SFs. Specifically, the ABS could use this parameter to control the traffic direction on RN SF, e.g., for the interference coordination purpose.
8. Other parameters for receiving PDSCH or for transmitting PUSCH by the RN such as the modulation and coding scheme, the transport block size, the HARQ related parameters (NDI, RV).

A detailed description of the contents of the PDCCH transmitted from the ABS to the RN, according to this set of embodiments, is as follows.

In some embodiments, the contents of the PDCCH include a Transmission_Code parameter, indicating to the RN one of the following possibilities for ABS and RN actions with respect to data communications between them. (A) A forthcoming PDSCH transmission from the ABS on the WBH. (B) A request for a PUSCH transmission from the RN to the ABS on the WBH. (C) No data communications between the ABS and the RN.

In some embodiments, the Transmission_Code can be a 2-bit parameter, with the values '00', '01' and '11' indicating the possibilities (A), (B) or (C) above, respectively.

In some embodiments, the contents of the PDCCH include the Action_Time_Start and Action_Time_End parameters, indicating to the RN the start and end times, respectively, of the transmissions indicated by the Transmission_Code. In one example, the Action_Time_Start and Action_Time_End parameters can indicate the starting OFDM symbol and the ending OFDM symbol of PDSCH/PUSCH, respectively. In another example, the Action_Time_ Start and Action_Time_End parameters can indicate the starting SF and the ending SF of PDSCH/PUSCH, respectively.

With reference to FIG. 26A, the PDCCH 3103 in ABS SF 3101, corresponding to SF duration index #N, can indicate the SF indices corresponding to the Action_Time_Start and Action_Time_End parameters relative to the index N of ABS SF 3101 which contains PDCCH 1103. Accordingly, the PDCCH can indicate the Action_Time_Start and Action_Time_End parameters to be certain values Action_Time_Start_Relative and Action_Time_End_Relative, implying that the transmissions indicated by the transmission code start and end at SF time indices (N+Action_Time_Start_Relative) and (N+Action_Time_End_Relative), respectively. (i) Each of Action_Time_Start_Relative and Action_Time_End_Relative are either 0 or positive integers. (ii) Action_Time_End_Relative is larger than or equal to Action_Time_Start_Relative. (iii) Action_Time_Start_Relative=0 indicates that the transmissions indicated by the Transmission_Code parameter start in the current SF period.

Alternatively, the PDCCH can indicate the SF indices corresponding to the Action_Time_Start and Action_Time_End as absolute indices, as Action_Time_Start_Absolute and Action_Time_End_Absolute, implying that the transmissions indicated by the transmission code start and end at SF time indices Action_Time_Start_Absolute and Action_Time_End_Absolute, respectively. (i) Each of Action_Time_Start_Absolute and Action_Time_End_Absolute are positive integers larger than or equal to the absolute index N of the ABS SF containing the PDCCH. (ii) Action_Time_End_Absolute is larger than or equal to Action_Time_Start_Absolute.

In the case that the PDCCH indicates, via the Transmission_Code parameter, that no data communications between the ABS and RN are forthcoming, the Action_Time_Start and Action_Time_End parameters indicate to the RN the start and end SF index of the period with no data communications with the ABS.

In some embodiments, the RN can indicate its minimum processing times to the ABS, either as part of the initial association with the ABS, or in a later exchange of information via a transmission to the ABS. In some other embodiments, the RN can indicate that it belongs to a certain RN category, with the system specification then defining the processing delays associated with such a RN category. In such cases, the ABS would set the Action_Time_Start and Action_Time_End parameters so as to take into account the processing delays at the RN, i.e., so that the RN has sufficient time to receive, interpret, and act on the information in the ABS PDCCH.

In some embodiments, the contents of the PDCCH include a Resource_Allocation parameter, informing the RN about the resources to be used for the transmissions indicated by the Transmission_Code parameter, and in the SFs indicated by the Action_Time_Start and Action_Time_End parameters. The resources indicated are the OFDM symbol and SC indices constituting the time-frequency resource grid in each of the indicated SFs that are to be utilized for the transmissions.

The PDCCH may not contain the Resource_Allocation parameter in the case that the PDCCH indicates, via the Transmission_Code parameter, that no data communications between the ABS and RN are forthcoming. Alternatively, in the same case, the RN can ignore the Resource_Allocation parameter if transmitted.

In some embodiments, the Resource_Allocation parameter indicates a set of resources common to all the indicated SFs. In other words, according to these embodiments, the same time-frequency resource grid as indicated by the Resource_Allocation parameter is utilized for the indicated transmissions in each of the indicated SFs.

In some embodiments, the contents of the PDCCH include an ABS_SF_DL_UP_Gap_Struct parameter informing the RN about the transmission structures of all the ABS SFs, starting from the current one and up-to the next ABS SF containing a PDCCH for the RN. Specifically, for each of those ABS SFs, this parameter specifies the symbols within the SF used for DL or UL transmissions, as well as the gap symbols in the SF. This information aids the RN in determining the transmission structure of the RN SFs with respect to communications with UEs in UE Set 2, which it is serving.

In some embodiments, ABS_SF_DL_UP_Gap_Struct can specify a single set of the numbers and symbol indices of the DL, UL and gap regions in the ABS SF, and applicable to all the ABS SFs up-to the next ABS SF containing a PDCCH for the RN. b) In some embodiments with the DL, UL and gap regions in the ABS SFs consisting of contiguous symbols, the ABS_SF_DL_UP_Gap_Struct parameter can indicate the numbers and beginning and ending symbol indices for each of the DL, UL and gap regions, for each of the ABS SFs.

Embodiments Set 4: RN DL Control Region Structure in SF Periods without ABS-to-RN PDCCH Transmission Embodiment Set 1 disclosed the structure of the RN DL control region in SF periods with ABS-to-RN PDCCH transmissions, whereas Embodiment Set 2 disclosed techniques for indication to the RN about the locations in time of such ABS SFs. This set of embodiments discloses the structure of the RN DL control region in SF periods with no ABS-to-RN PDCCH transmissions.

Figure 27:
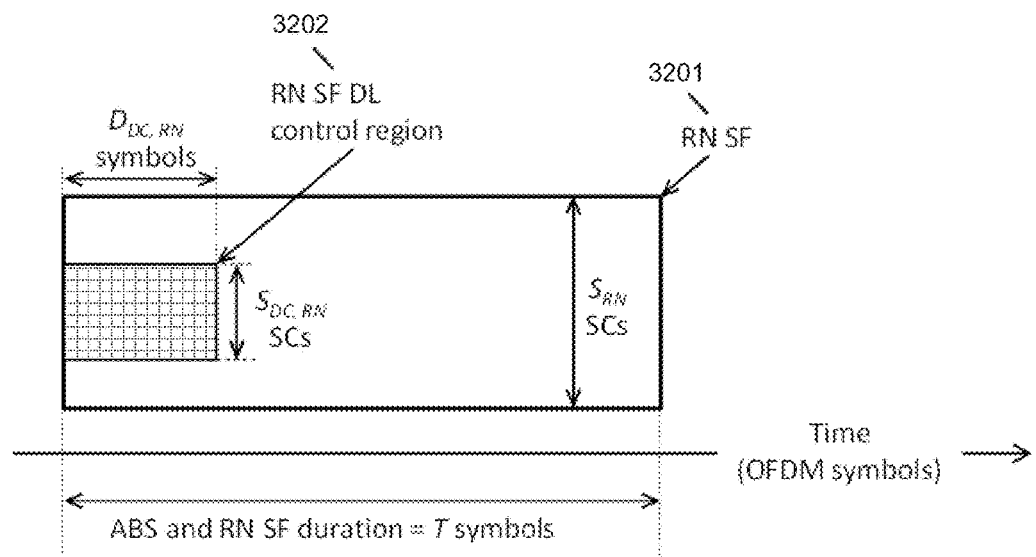
FIG. 27 illustrates the structure of the RN DL control region for this case according to present disclosure.

FIG. 27 illustrates the structure of the RN DL control region for this case according to present disclosure. RN SF 3201 occupies a maximum of $S_{RN}$ SCs in frequency and T symbols in time, where T symbols is the time occupancy of the corresponding and on-going ABS SF as well. RN SF 3201 contains the DL control region 3202, which occupies a time-frequency grid of $D_{DC,RN}$ symbols, starting from the beginning RN SF 3201, and $S_{DC,RN}$ SCs. The RN DL control region, as explained earlier, can contain PDCCHs transmitted by the RN to UE Set 2.

Some embodiments can employ some or all of the following specific parameter value settings: $S_{DC,RN}=S_{RN}$, i.e., the DL control region in the RN SF occupies all SCs in the first $D_{DC,RN}$ symbols of the SF; and $D_{DC,RN}=1$, 2, or 3 symbols.

Comparing with the structure of the RN SF 3004 for the case with an ABS-to-RN PDCCH transmission, it is seen that the RN SF 3201 for the present case does not have a gap region in the beginning of the RN SF. The gap region in the RN SF 3004 allowed the RN to receive the PDCCH from the ABS; such a gap is not required in the current case, since there is no ABS PDCCH transmission to the RN in the RN SF 3201 period.

The position of the RN DL control region within the RN SF can vary across RN SFs according to previously described embodiments of this invention. The RN DL control region is used by the RN to transmit PDCCHs to UEs in UE Set 2, which are served it the RN. The UEs should therefore have knowledge of the region in the RN SF over which to search for and attempt to receive the RN PDCCH transmissions. The next set of embodiments disclose techniques used by UEs in UE Set 2 to determine the location of the DL control region in the RN SFs.

Embodiments Set 5: RN DL Control Region Structure Determination by UE Set 2

In the following description related to this embodiment set, UE refers to a UE in UE Set 2, the set of UEs associated with the RN.

Figure 28:
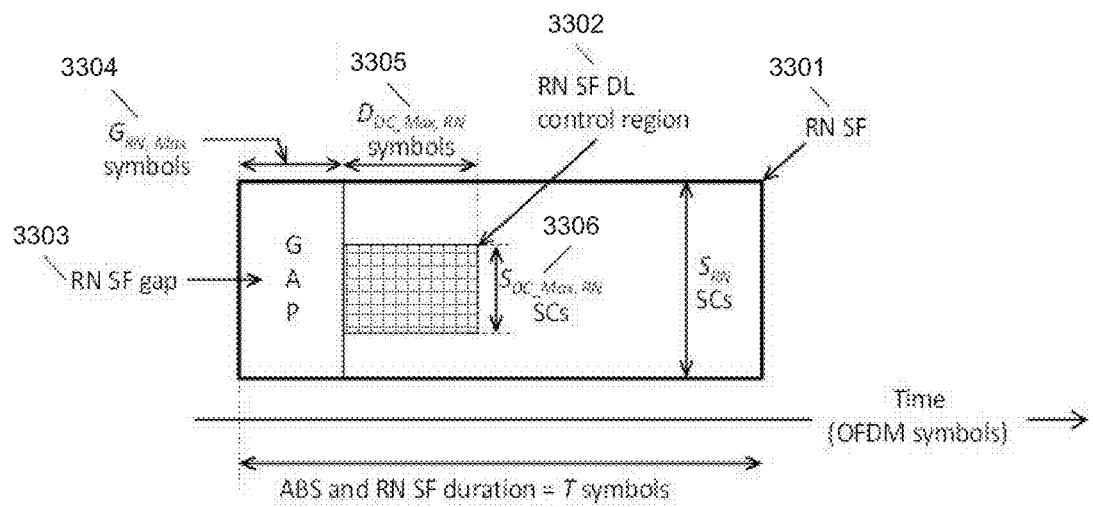
FIG. 28 illustrates parameters in a subframe to be indicated to the UE during the process of UE association with the RN.

FIG. 28 illustrates parameters in a subframe to be indicated to the UE during the process of UE association with the RN.

According to some embodiments, the following parameters are defined in the system specifications or are indicated to the UE by the RN during the process of UE association with the RN. These parameters are illustrated in FIG. 28. (1) The maximum length of the gap region 3303 at the beginning of any RN SF, in symbols, identified as the parameter $G_{RN, Max}$ in 3304. As disclosed in the context of Embodiment Set 1, the RN SF has a gap region in the beginning of the SF to allow RN reception of the ABS PDCCH transmission. The parameter $G_{RN, MAX}$ 3304 defines its maximum value, which, in some embodiments, can be a constant value of the length of the gap. (2) The maximum time occupancy in time $D_{DC\_MAX, RN}$ symbols 3305 as well as the maximum occupancy in frequency $S_{DC\_Max, RN}$ SCs 3306 of the RN SF DL control region 3302.

The UE can then perform a search and attempt the reception of a possible PDCCH transmitted to it over the time-frequency grid defined by $(D_{DC\_MAX, RN}+G_{RN, Max})$ symbols and $S_{DC\_Max, RN}$ SCs. In other words, the UE can search over the maximum range of the time-frequency grid that can contain a PDCCH transmission directed to it.

SYSTEM OPERATION EXAMPLES

Some illustrative examples of the operation of the unified wireless backhaul and access system, enabled by the previously disclosed embodiments, are presented next. These examples illustrate the operations with particular settings of the parameter values disclosed in the various embodiments. In particular, in these examples, the Action_Time_Start and Action_Time_End parameters described earlier, are set to 0, indicating that the RN is to receive and interpret the PDCCH from the ABS, and take the appropriate decisions in the same SF. As described earlier, the RN may not be capable of processing the ABS PDCCH in the same SF, and can indicate its minimum processing times to the ABS. In such a case, the ABS would set the Action_Time_Start and Action_Time_End parameters so as to take into account the processing delays at the RN. The figures with respect to this section would then be generalized to include the processing gap at the RN.

A point to note is that in these examples, the ABS and the RN do not simultaneously transmit and receive; at any given time, they are either in transmit or in receive mode. This is referred to in the art as the half-duplex constraint. Such an operation prevents the inter-antenna leakage interference that arises when, at the same entity (ABS, RN or UE) and at the same time, one antenna transmits and another one receives; leakage of the transmitted signal from the transmit antenna creates possibly unacceptably high interference with respect to the receive signal at the receive antenna.

Example Operation 1A Backhaul Data Transmission from ABS to RN

Figure 29A:
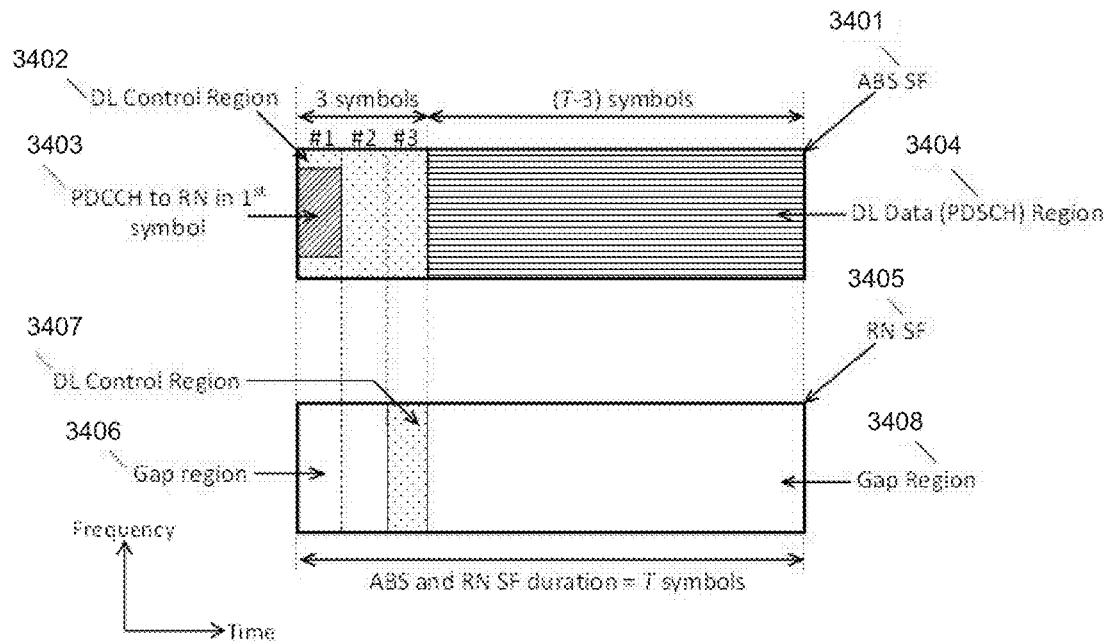
FIGS. 29A-29C illustrate an example operation wherein the ABS transmits backhaul data to the RN in accordance with the present disclosure.
Figure 29B:
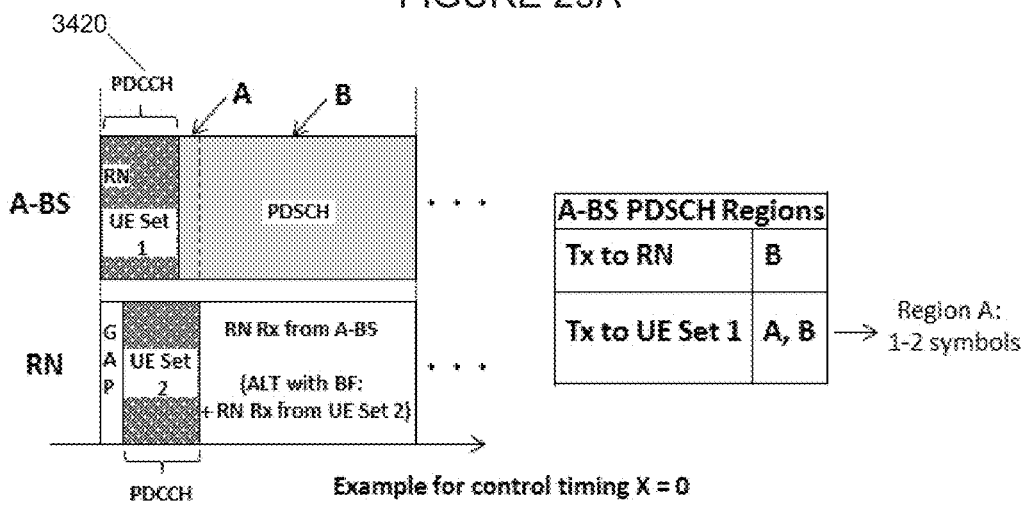
Figure 29C:
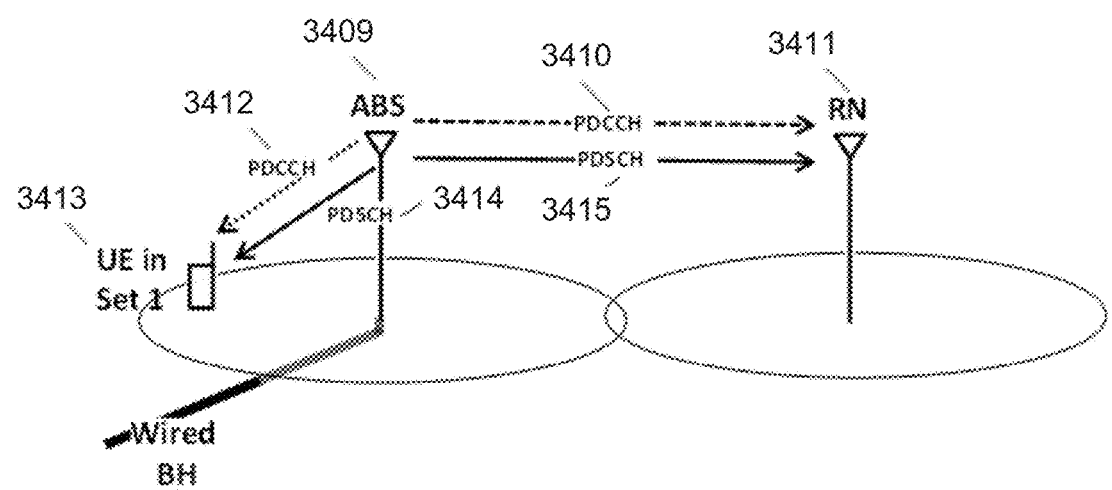

FIGS. 29A to 29C illustrate an example operation wherein the ABS transmits backhaul data to the RN, while simultaneously transmitting data on the DL to UEs in UE Set 1, the set of UEs associated with it.

ABS SF 3401 is T symbols in duration, with all symbols having the same frequency occupancy, and contains a DL control region 3402 which is 3 symbols in duration. The RN SF 3405, which also has a duration of T symbols, with all symbols having the same frequency occupancy of the ABS SF symbols, contains a gap region 3406 in the beginning of the SF of 2 symbols duration, followed in time by a DL control region 3407 of 1 symbol duration.

The ABS configures the remaining (T−3) symbols of the ABS SF 3401 to be a DL data region 3404, i.e., a region in which it will transmit a PDSCH.

The ABS 3409 transmits a PDCCH 3410 to the RN 3411 in the 1$^{st}$ symbol of the ABS SF DL control region 3402, as illustrated by 3403. The PDCCH has the following contents relevant to this example operation: 1. A Transmission_Code parameter, indicating to the RN if there is a forthcoming transmission from the ABS. 2. Action_Time_Start and Action_Time_End parameters, both set to 0, to indicate to the RN that the transmission from the ABS will start and end in the current SF duration. 3. A Resource_Allocation parameter, informing the RN that the resources in the DL data region 3404 will be used for the ABS transmission.

The RN 3411 attempts PDCCH reception in the gap region 3406 of its SF 3405. On successful PDCCH reception, the RN recognizes that it needs to receive the PDSCH transmission from the ABS during the last (T−3) symbols of its SF 3405. Accordingly, the RN does not transmit a PDCCH to any UEs in UE Set 2, thus effectively configuring the last (T−3) symbols in the RN SF 3405 to be a gap region 3408 during which it can receive the PDSCH from transmitted from the ABS.

The ABS 3409 transmits a PDCCH 3412 to a set of UEs in UE Set 1, one of which is illustrated as 3413, in the DL control region 3402 outside of the region 3403 used to transmit a PDCCH to the RN. This PDCCH informs the relevant UEs in UE Set 1 about a PDSCH transmission from the ABS in the DL data region 3404.

The ABS 3409 then transmits PDSCH 3415 containing backhaul data to the RN 1411, as well as the PDSCH 3414 containing UE data to UE 3413 in UE Set 1, over the resources of the DL data region 3404; PDSCH reception operations occur at the RN and the respective UEs in UE Set 1.

In this example, the ABS 3409, configures the DL data region 3404 for simultaneous PDSCH transmissions to the RN and UEs in UE Set 1. Such a transmission can be implemented, for example, by the usage of an arrays of transmit antenna at the ABS, enabling simultaneous transmissions to the UEs and the RN by exploiting the spatial separation between them, while minimizing interference between the transmission and maintaining acceptable received signal quality at the UEs and the RN. In the absence of ABS capability for such simultaneous transmissions, the ABS can transmit a PDSCH to either the RN or a UE in UE Set 1.

FIG. 29B illustrates an example of the same backhaul data transmission from ABS to RN as FIG. 29A where the PDSCH corresponding to the scheduling PDCCH in an ABS SF and the PUSCH corresponding to the scheduling PDCCH in an RN SF are transmitted in the same SF.

Example 1B: Backhaul Data Transmission from ABS to RN

Figure 30A:
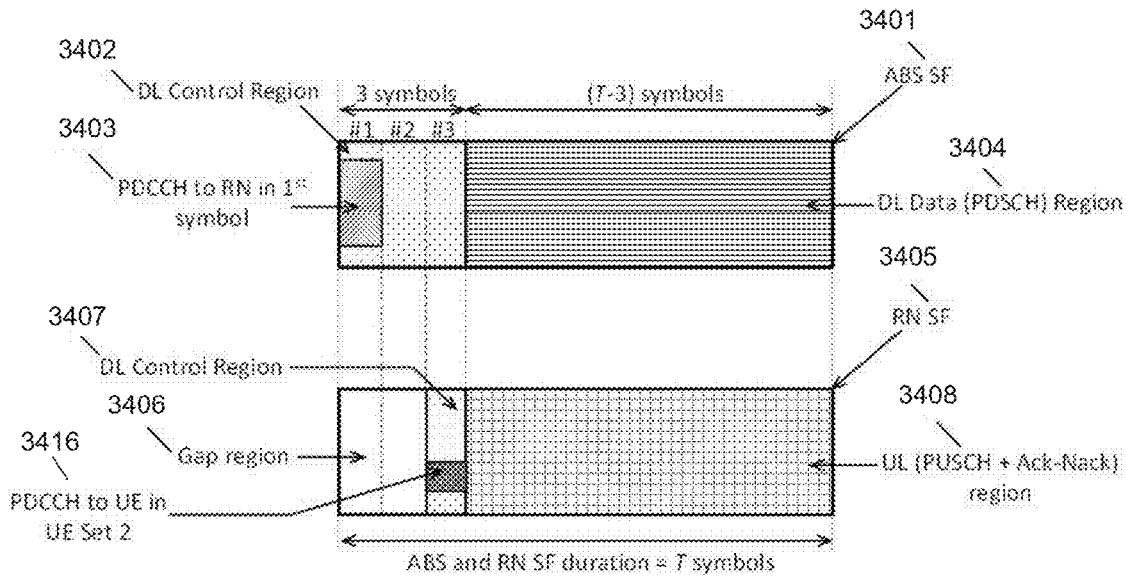
FIGS. 30A and 30B illustrate another example operation wherein the ABS transmits backhaul data to the RN in accordance with the present disclosure.
Figure 30B:
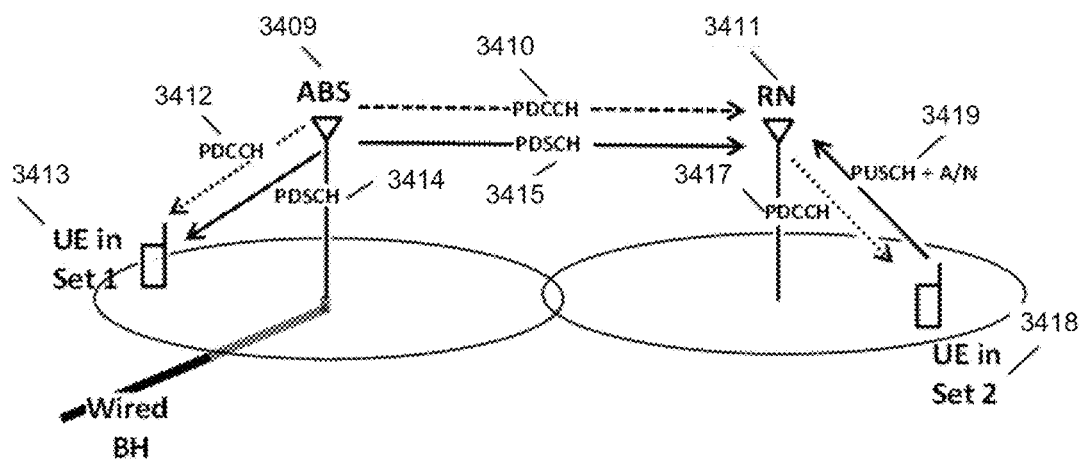

FIGS. 30A to 30B illustrate an example operation very similar to the example operation in FIG. 29A to 29C in accordance with the present disclosure. In this example, in addition to receiving backhaul data via a PDSCH transmission from the ABS, the RN also receives UL PUSCH and Ack-Nack (A/N) transmissions from UEs in UE Set 2, the set of UEs it serves. Here, the A/N transmissions carry acks/nacks from the UEs with respect to earlier DL transmissions from the RN.

The ABS actions in this example are identical to those in the previous example Example 1a. Some of the RN actions are different, as detailed in the following.

In this example, after receiving the PDCCH 3403 transmitted from the ABS informing the RN about the PDSCH transmission in the region 3404 of the SF, the RN 3411 configures the region 3408 in the last (T−3) symbols in its SF 3405 as a UL region, where it can receive PUSCH transmissions from UEs in UE Set 2. It then transmits a PDCCH 3416 in its DL control region 3407 to an example UE 3418 in UE Set 2; this operation is also illustrated by 3417. PDCCH 3417 instructs UE 3418 to transmit a PUSCH in the region 3408.

In this example, the RN 3411 simultaneously receives a PDSCH transmission from the ABS, as well as PUSCH transmissions from UEs in UE Set 2. As with the simultaneous transmission by the ABS to the RN as well as UE in UE Set 1, this can be implemented, for example, via the usage of arrays of receive antennas at the RN, enabling simultaneous receptions from the ABS and the UEs by exploiting the spatial separation between them, while minimizing interference between the received signals at the RN from the ABS and each UE.

Example 2: Backhaul Data Transmission from RN to ABS

Figure 31A:
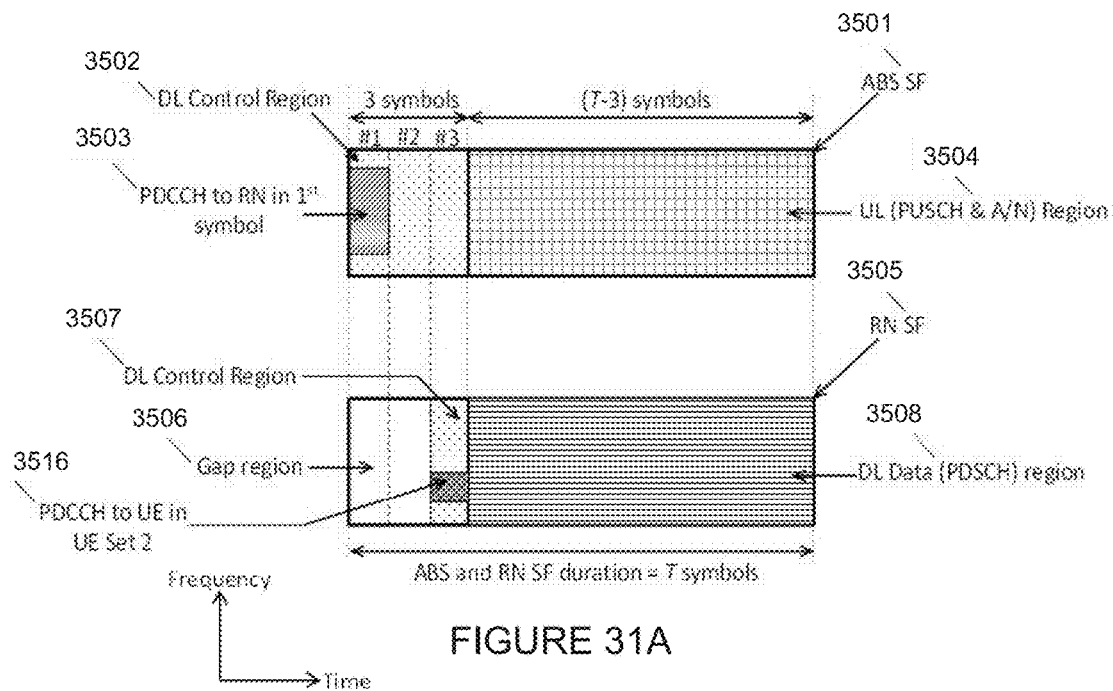
FIGS. 31A-31C illustrate an example operation wherein the ABS receives backhaul data from the RN in accordance with the present disclosure.
Figure 31B:
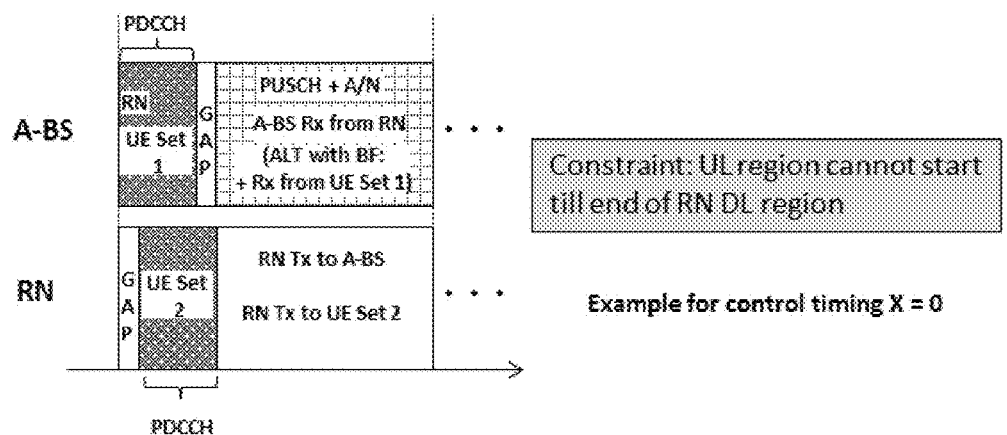
Figure 31C:
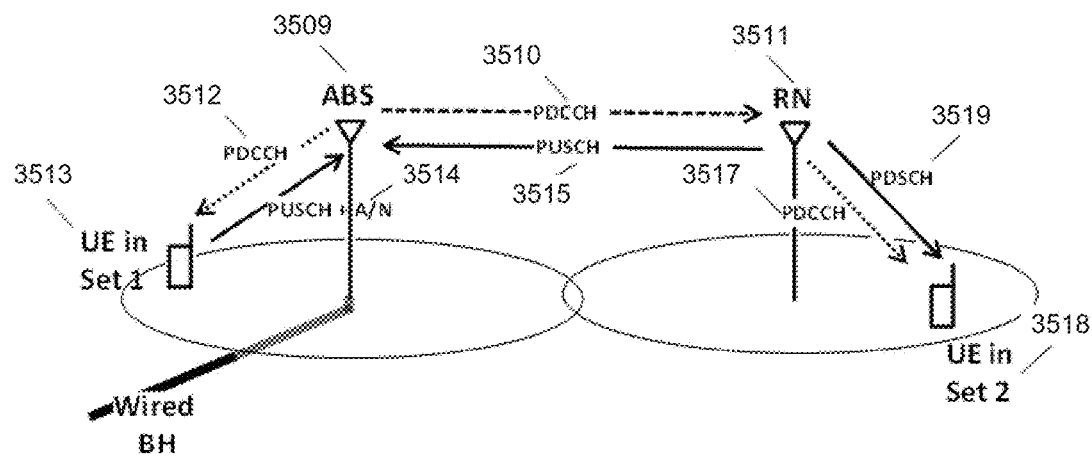

FIGS. 31A to 31C illustrates an example operation wherein the ABS receives backhaul data from the RN, while simultaneously transmitting data on the DL to UEs in UE Set 1, the set of UEs associated with it. The structure of the ABS and RN SFs is as described earlier with respect to FIGS. 30A to 30C.

The ABS 3509 configures the last (T−3) symbols of the ABS SF 3501 to be a UL region 3504, i.e., a region in which it will receive transmissions from UEs in UE Set 1 as well as from the RN.

The ABS 3509 transmits a PDCCH 3510 to the RN 3511 in the 1$^{st}$ symbol of the ABS SF DL control region 3502, as illustrated by 3503. The PDCCH has the following contents relevant to this example operation: 1. A Transmission_Code parameter, indicating to the RN if there is a forthcoming transmission from the ABS. 2. Action_Time_Start and Action_Time_End parameters, both set to 0, to indicate to the RN that the transmission from the ABS will start and end in the current SF duration. 3. A Resource_Allocation parameter, informing the RN that the resources in the UL region 3504 are to be used by the RN to make a transmission to the ABS.

The ABS 3509 transmits a PDCCH 3512 to a set of UEs in UE Set 1, one of which is illustrated as 3513, in the DL control region 3502 outside of the region 3503 used to transmit the PDCCH to the RN. This PDCCH informs the relevant UEs in UE Set 1 that they are to make PUSCH and/or Ack/Nack transmissions to the ABS in the UL region 3504.

The RN 3511 attempts PDCCH reception in the gap region 3506 of its SF 3505. On successful PDCCH reception, the RN recognizes that it needs to transmit UL data to the ABS during the last (T−3) symbols of its SF 3505; this data has been buffered by the RN after reception from UEs in UE Set 2. The RN can simultaneously transmit PDSCH to UEs in UE Set 2; the RN accordingly configures the last (T−3) symbols of its SF 3505 as a DL region, where it can receive PUSCH transmissions from UEs in UE Set 2. It then transmits a PDCCH 3516 in its DL control region 3507 to an example UE 3518 in UE Set 2; this operation is also illustrated by 3517. PDCCH 3517 instructs UE 3518 that the RN will transmit a PDSCH to it in the region 3508.

The RN 3511 then transmits a PUSCH 3515 containing backhaul data to the ABS 3509, while also simultaneously transmitting a PDSCH to the example UE 3518 in UE Set 2, over the SF resources 3504 and 3508. UE in UE Set 1, an example of which is UE 3513, transmit PUSCH and/or Ack/Nack to ABS 3509 over the UL region of the ABS SF 3504.

In this example, the ABS 3409 simultaneously receives PUSCH transmissions from both UEs in UE Set 1 as well as from the RN, while the RN 3511 makes simultaneous PUSCH and PDSCH transmissions to the ABS and UEs in UE Set 2. As explained in Examples 1a and 1b, such simultaneous reception and transmission can be achieved, for example, by the usage of arrays of receive and transmit antenna at the ABS and RN, respectively.

FIG. 31B illustrates an example of ABS-to-RN PDCCH transmission in a SF as FIG. 31A where the PUSCH corresponding to the scheduling PDCCH in an ABS SF and the PDSCH corresponding to the scheduling PDCCH in an RN SF are transmitted in the same SF.

In the absence of ABS capability for such simultaneous receptions, the ABS can configure its SF so that it receives UL transmission from the RN. In this case, the ABS would not make any PDCCH transmissions to UE Set 1, thus effectively reserving the UL region in its SF for PUSCH reception from the RN.

Similarly, in the absence of RN capability for such simultaneous transmissions, it can transmit a PUSCH only to the RN. In this case, the RN would not transmit a PDCCH to any UEs in UE Set 2, thus effectively configuring the last (T−3) symbols in the RN SF to be gap region where it makes a PUSCH transmission to the ABS.

Although the disclosure has been shown and described with reference to certain embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A relay node capable of supporting wireless backhaul communication, the relay node comprising:
 a controller configured to identify a first timing of a backhaul downlink (DL) transmission and a second timing of an access uplink (UL) transmission to be substantially aligned; and
 a transceiver configured to:
  indicate, to a base station (BS), a time period to process at least one physical control channel,
  receive, from the BS, at least one first symbol in the backhaul DL transmission in a predetermined beginning portion of the backhaul DL transmission on the at least one physical control channel based on the time period indicated by the relay node; and; and
  receive at least a second symbol in the access UL transmission from a user equipment (UE) after receipt of the backhaul DL transmission from the BS.

2. The relay node of claim 1, wherein:
 the controller is further configured to substantially align a third timing of a backhaul UL transmission and a fourth timing of an access DL transmission, and
 the transceiver is further configured to transmit at least third symbol in a backhaul UL transmission to the BS, and transmit at least fourth symbol in the access DL transmission to the UE.

3. The relay node of claim 1, wherein the backhaul DL transmission comprises a control region containing the at least one physical control channel informing the rely node of a location of resources of DL data to be transmitted from the BS.

4. The relay node of claim 3, wherein the at least one physical control channel indicates a periodicity of occurrence of backhaul DL transmissions in which the BS is configured to transmit a next physical control channel to the relay node.

5. The relay node of claim 1, wherein the access UL transmission comprises an Ack/Nack region for an Ack/Nack feedback regarding a reception success or failure of a DL data packet.

6. The relay node of claim 1, wherein:
 the relay node is configured to indicate the time period as a minimum time to process the at least one physical control channel to the BS, and
 a location of resources of DL data is determined based on the time period.

7. The relay node of claim 1, wherein:
 the backhaul downlink (DL) transmission includes a physical downlink control channel (PDCCH) that includes a DL resource configuration, and
 the controller is further configured to determine a location of resources to receive a DL data from the BS according to the DL resource configuration.

8. A base station (BS) capable of supporting wireless backhaul communication, the BS comprising:
 a controller configured to substantially align a first timing of a backhaul downlink (DL) transmission and a second timing of an access downlink (DL) transmission; and
 a transceiver configured to:
  receive, from a relay node, a time period for processing at least one physical control channel;
  transmit, to a relay node, at least one first symbol in the backhaul DL transmission in a predetermined beginning portion of the backhaul DL transmission on the at least one physical control channel based on the time period indicated by the relay node; and; and
  transmit at least a second symbol in the access DL transmission to a user equipment (UE) after transmission of the backhaul DL transmission.

9. The BS of claim 8, wherein:
 the controller is further configured to identify a third timing of a backhaul UL transmission and a fourth timing of an access UL transmission to be substantially aligned; and
 the transceiver is further configured to receive at least third symbol in a backhaul UL transmission from a relay node, and receive at least fourth symbol in the access UL transmission from the UE.

10. The BS of claim 8, wherein the backhaul DL transmission comprises a control region containing the at least one physical control channel informing the rely node of a location of resources of DL data to be transmitted from the BS.

11. The BS of claim 10, wherein the at least one physical control channel indicates a periodicity of occurrence of backhaul DL transmissions in which the BS is configured to transmit a next physical control channel to the relay node.

12. The BS of claim 8, wherein the access DL transmission is transmitted within an Ack/Nack region for an Ack/Nack feedback regarding a reception success or failure of a DL data packet.

13. The BS of claim 8, wherein the time period is a minimum time to process the at least one physical control channel and a location of resources of DL data is determined based on the time period.

14. The BS of claim 8, wherein:
the backhaul downlink (DL) transmission includes a physical downlink control channel (PDCCH) that includes a DL resource configuration, and
the controller is configured to determine a location of resources to receive a DL data from the relay node according to the DL resource configuration.

15. A method for supporting wireless backhaul communication in a relay node, the method comprising:
identifying a first timing of a backhaul downlink (DL) transmission and a second timing of an access uplink (UL) transmission to be substantially aligned;
indicating, to a base station (BS), a time period to process at least one physical control channel;
receiving, from the BS, at least one first symbol in the backhaul DL transmission in a predetermined beginning portion of the backhaul DL transmission on the at least one physical control channel based on the time period indicated by the relay node; and; and
receiving at least a second symbol in the access UL transmission from a user equipment (UE) after receipt of the backhaul DL transmission from the BS.

16. The method claim 15, further comprising:
identifying a third timing of a backhaul UL transmission and a fourth timing of an access DL transmission to be substantially aligned;
transmitting at least third symbol in the backhaul UL transmission to the BS; and
transmitting at least fourth symbol in the access DL transmission to the UE.

17. The method of claim 15, wherein the backhaul DL transmission comprises a control region containing the at least one physical control channel informing the rely node of a location of resources of DL data to be transmitted from the BS.

18. The method of claim 17, wherein the at least one physical control channel indicates a periodicity of occurrence of backhaul DL transmissions in which the BS transmits a next physical control channel to the relay node.

19. The method of claim 15, wherein the access UL transmission comprises an Ack/Nack region for a Ack/Nack feedback regarding a reception success or failure of a DL data packet.

20. The method of claim 15, wherein the relay node indicates the time period as a minimum time to process the at least one physical control channel to the BS, and a location of resources of DL data is determined based on the time period.

* * * * *